United States Patent
Shakiba et al.

(10) Patent No.: US 8,462,759 B2
(45) Date of Patent: Jun. 11, 2013

(54) MULTI-MEDIA DIGITAL INTERFACE SYSTEMS AND METHODS

(75) Inventors: Mohammad Hossein Shakiba, Richmond Hill (CA); John Hudson, Burlington (CA); Jack MacDougall, Mississauga (CA); Martin Rofheart, Falls Church, VA (US); David L. Lynch, Burlington (CA)

(73) Assignee: Semtech Canada Corporation (CA)

( * ) Notice: Subject to any disclaimer, the term of this patent is extended or adjusted under 35 U.S.C. 154(b) by 1401 days.

(21) Appl. No.: 12/029,053

(22) Filed: Feb. 11, 2008

(65) Prior Publication Data

US 2008/0201756 A1    Aug. 21, 2008

Related U.S. Application Data

(60) Provisional application No. 60/901,777, filed on Feb. 16, 2007, provisional application No. 60/939,403, filed on May 22, 2007, provisional application No. 60/956,394, filed on Aug. 17, 2007.

(51) Int. Cl.
*H04B 7/208* (2006.01)
(52) U.S. Cl.
USPC .......................................... 370/344; 370/480
(58) Field of Classification Search
USPC .................................. 370/344, 480
See application file for complete search history.

(56) References Cited

U.S. PATENT DOCUMENTS 3,859,469 A * 1/1975 Getgen .......................... 370/295
6,748,076 B1 * 6/2004 Elo .............................. 379/402
7,295,578 B1 * 11/2007 Lyle et al. ..................... 370/503

(Continued)

FOREIGN PATENT DOCUMENTS

| CA | 2621256 A1 | 8/2008 |
| CN | 1581717 A | 2/2005 |

OTHER PUBLICATIONS

PCT/CA2010/000903, Notification of Transmittal of the International Search Report and the Written Opinion of the International Search Authority, dated Oct. 19, 2010, 9 pages.

(Continued)

*Primary Examiner* — Sath V Perungavoor
*Assistant Examiner* — Jeffery Williams
(74) *Attorney, Agent, or Firm* — Jones Day

(57) ABSTRACT

Systems and methods are provided herein for interfacing a first multi-media digital device with a second multi-media digital device. An exemplary method includes the steps of: (i) converting a plurality of differential digital content channels from the first multi-media digital device into a plurality of single-ended digital content channels; (ii) transmitting the plurality of single-ended digital content channels from the first multi-media digital device to the second multi-media digital device via one or more coaxial cables; and (iii) receiving the single-ended digital content channels from the one or more coaxial cables and converting the single-ended digital content channels back into a plurality of differential digital content channels that are supplied to the second multi-media digital device. Additional steps of the exemplary method may include: (i) transmitting one or more auxiliary channels between the first multi-media digital device and the second multi-media digital device; and (ii) combining the one or more auxiliary channels with at least one of the plurality of digital content channels to form a combined channel to be transmitted from the first multi-media digital device to the second multi-media digital device.

122 Claims, 18 Drawing Sheets

U.S. PATENT DOCUMENTS

| | | | |
|---|---|---|---|
| 7,330,703 | B2 | 2/2008 | Verbist |
| 7,450,715 | B2 | 11/2008 | Verbist |
| 7,536,017 | B2 | 5/2009 | Sakurai et al. |
| 7,940,707 | B2 | 5/2011 | Verbist |
| 2005/0069130 | A1 | 3/2005 | Kobayashi |
| 2005/0198686 | A1* | 9/2005 | Krause et al. ............. 725/118 |
| 2006/0077778 | A1* | 4/2006 | Tatum et al. ............ 369/44.11 |
| 2006/0238396 | A1* | 10/2006 | Bertrand ................. 341/143 |
| 2007/0263713 | A1 | 11/2007 | Aronson |
| 2008/0013053 | A1* | 1/2008 | Anson ...................... 353/69 |
| 2008/0013725 | A1 | 1/2008 | Kobayashi |
| 2008/0045162 | A1 | 2/2008 | Rofougaran et al. |
| 2008/0069191 | A1 | 3/2008 | Dong et al. |

OTHER PUBLICATIONS

Office Action issued by the Chinese Patent Office for Application Serial No. 200810127738.9, dated Dec. 3, 2010, 17 pages.

Extended European Search Report dated Oct. 5, 2011 for European Patent Application No. 08002881.4.

Hashemi, H. "Differential-to-Single-Ended Converter", EDN Electrical Design News, Mar. 14, 2006, p. 96.

Hudson et al., "3G: The Evolution of the Serial Digital Interface (SDI)", SMPTE Motion Imaging Journal, Nov./Dec. 2006, pp. 472-481.

Michel et al., "A Novel Method to Linearise Phase Response of Single-Ended to Differential Converters for High Bit Rates", 2004 IEEE MTT-S Digest, pp. 1193-1196.

Office Action Issued by the Chinese Patent Office for Application Serial No. 200810127738.9 dated Dec. 5, 2012.

Office Action Issued by the Korean Office for Application Serial No. 10-2012-7000941 dated Dec. 10, 2012.

* cited by examiner

| 150 | | HIGH-PASS | FIRST BAND-PASS | SECOND BAND-PASS | LOW-PASS |
|---|---|---|---|---|---|
| HDMI OVER 5 CABLE BUNDLE | CABLE 1 | DATA2 | — | — | CEC |
| | CABLE 2 | DATA1 | — | — | SCL |
| | CABLE 3 | DATA0 | — | — | SDA |
| | CABLE 4 | CLOCK | — | — | HPD |
| | CABLE 5 | POWER | | | |
| DISPLAYPORT OVER 4 CABLE BUNDLE | CABLE 1 | Lane0 | — | — | CEC |
| | CABLE 2 | Lane1 | — | — | AUX |
| | CABLE 3 | Lane2 | — | — | HPD |
| | CABLE 4 | Lane3 | — | — | POWER |
| DISPLAYPORT OVER SINGLE CABLE WITHOUT POWER | CABLE 1 | Lane 0 | AUX | — | HPD |
| DISPLAYPORT OVER SINGLE CABLE WITH POWER | CABLE 1 | Lane 0 | AUX | HPD | POWER |

Fig. 10

| 160 | | HIGH-PASS | FIRST BAND-PASS | SECOND BAND-PASS | LOW-PASS |
|---|---|---|---|---|---|
| HDMI OVER 5 CABLE BUNDLE | CABLE 1 | 5MHz | — | — | 200KHz |
| | CABLE 2 | 5MHz | — | — | 200KHz |
| | CABLE 3 | 5MHz | — | — | 200KHz |
| | CABLE 4 | 5MHz | — | — | 200KHz |
| | CABLE 5 | POWER | | | |
| DISPLAYPORT OVER 4 CABLE BUNDLE | CABLE 1 | 10MHz | — | — | 4KHz |
| | CABLE 2 | 10MHz | — | — | 5MHz |
| | CABLE 3 | 10MHz | — | — | 4KHz |
| | CABLE 4 | 10MHz | — | — | 2KHz |
| DISPLAYPORT OVER SINGLE CABLE WITHOUT POWER | CABLE 1 | 10MHz | 20KHz-5MHz | — | 2KHz |
| DISPLAYPORT OVER SINGLE CABLE WITH POWER | CABLE 1 | 10MHz | 20KHz-5MHz | 200Hz-2KHz | 100Hz |

Fig. 11

MULTI-MEDIA DIGITAL INTERFACE SYSTEMS AND METHODS

CROSS-REFERENCE TO RELATED APPLICATIONS

This application claims priority to the following United States Provisional Applications, each of which is hereby incorporated by reference into this patent application as if fully set forth herein: (1) U.S. 60/901,777, titled "Multi-Media Digital Interface over a Single Link," filed on Feb. 16, 2007; (2) U.S. 60/939,403, titled "Alternate Physical Interface for Multi-Media Digital Interconnect," filed on May 22, 2007; and (3) U.S. 60/956,394, titled "Link Reduction of Digital Multi-Media Interfaces Using Hybrid Frequency Multiplexing," filed on Aug. 17, 2007.

BACKGROUND

As multi-media displays and audio/video processing devices increasingly transition to higher performance technologies that support more functionalities and features, the problem of interfacing becomes more complex. The challenge is to establish reliable communications with a minimum number of channels that meet the performance and cost objectives of the application. Known interface technologies, such as VGA, component video, DVI, HDMI, DisplayPort, and SDI provide several examples of current multi-media interconnect technology. These known technologies, however, suffer from several limitations.

For example, VGA is limited in its ability to scale to support higher resolutions and color depths, and it does not have a means available to protect high definition content for consumer use. In addition, VGA does not provide native multimedia connectivity, being limited to video and graphics with limited control via the Display Data Channel (DDC) interface. The VGA connector and cabling is also physically very large, difficult to route, and relatively expensive.

Analog component video, like VGA, suffers from similar scalability issues and lack of true multi-media support, although there is a defined means (Macro Vision™) to protect content for consumer use. The Macro Vision™ technique, however, provides only a limited level of protection. The component connectors and cabling provide probably the best performance of all existing interfaces in terms of cost, routability, and signal integrity. In addition, like VGA, long cable runs of many 10's of meters are possible with component video before any noticeable signal loss becomes apparent.

DVI technology is limited in that the DVI 1.0 specification is in essence frozen and cannot be easily updated to support higher clock speeds, color depths, connector types, or new features. Although DVI does provide optional content protection, there is no support for audio. DVI connectors and cabling are also physically very large and difficult to route, and the cable length is extremely limited and is very expensive. Moreover, Interoperability issues have plagued this interface, which has contributed to the relatively low adoption rate for DVI, even in the target application of PC to monitor interfaces. Another limitation of DVI is that the physical interface requires a 3.3V supply and the signaling is DC-coupled into the interface media. This severely restricts technology migration into low-voltage silicon applications that will be found in future PCs and other multi-media applications.

HDMI is well-suited for its application to TVs, but falls short for broad cross-industry application support due to limitations in terms of performance scalability. HDMI also suffers from being a closed and proprietary standard with stringent compliance testing and licensing issues. Although HDMI does provide true multi-media support and optional content protection, being a super-set of DVI it exhibits similar operational constraints. Like DVI, HDMI cable is bulky and exceedingly expensive, although the HDMI connector design is substantially smaller than the DVI connector. HDMI cable lengths are typically restricted and interoperability issues with the interface are very common.

DisplayPort provides an open, extensible, and scalable multi-media digital interface targeted as a replacement for existing interfaces in PC-to-display and inside-the-box applications. It is, however, focused mainly on PC-to-display connectivity, much as HDMI is focused on consumer electronics multi-media applications. DisplayPort also suffers from limited cable length with a typical three meters for full bandwidth support. Although limited interoperability tests have been carried out, wide-scale deployment of DisplayPort will be required to prove or disprove the technology claims of robustness. Connector and cabling costs and performance are therefore unknown at this time.

The SDI interface has enjoyed over 20 years of development, evolution, and continuous interoperability testing in professional applications. This open standard interface provides multi-media connectivity over a coaxial cable connection that does not suffer from the cable length limitations, routability, interoperability, or high connectivity costs of the other digital interfaces described herein. The almost exclusive use of SDI in professional applications does, however, mean that the need for content protection and bi-directional command and control information has not as of yet been addressed in the interface.

Among the aforementioned standards, only SDI operates on a single coaxial copper link. The DVI, HDMI, and DisplayPort interfaces all employ bundles of different cables, typically comprising several twisted pairs accompanied by additional single wires, all enclosed in an outer insulator layer. The electrical and physical characteristics of these interfaces have led to performance disadvantages in achieving cable lengths even far shorter than that of SDI.

The electrical characteristics and physical media for DVI, HDMI and DisplayPort utilize low voltage differential signaling (e.g., transition minimized differential signaling or TMDS) over multiple twisted pair copper cables. As the data rate requirements for these interfaces extend into the multiple Gb/s range, the limitations of the signaling and twisted pair copper cable media have an increasingly detrimental effect on cable reach and reliability of operation. These limitations are due to two major sources of signal degradation: (1) attenuation; and (2) intra-pair skew.

The loss characteristic 10 of a typical cable used in HDMI, DVI, or DisplayPort applications is shown in FIG. 1. In this figure, four different lengths of cable (2.5 m, 5 m, 10 m and 20 m) are described, and the attenuation loss of the cable, measured in dB, is plotted as a function of frequency. Also shown in this figure as dashed vertical lines, are the frequencies of most interest in current HDTV standard implementations, including 720p/1080i, 1080p and 1080p Deep Color. As shown in this figure, as the cable lengths extend beyond 5 m, losses become substantial.

In addition to losses caused by attenuation in the cable, signal loss in the HDMI, DVI, or DisplayPort interface technologies can also be attributed to the effects of intra-pair skew. FIG. 2, for example, illustrates cable attenuation as a function of intra-pair skew for a typical cable. It should be noted that this loss is not included in the diagram of FIG. 1 and at higher data rates, significant additional attenuation is added to the losses illustrated therein.

The application of transmitter pre-emphasis and/or receiver cable equalization is widely deployed to improve performance of these interfaces, and at data rates greater than about 1.5 Gb/s per signaling lane, application of these technologies is instrumental. This rate is significant as it represents the transmission of full high-definition video (1920× 1080p 60 RGB 444 10-bit). By utilizing pre-emphasis and/or receiver equalization, reliable operation at this rate can typically be achieved for cable lengths in the range of about 5 to 10 meters. Improvements in cable manufacturing technologies and the use of thick (24 AWG) twisted pair cables with multiple layers of shielding can further improve connectivity by reducing signal attenuation and controlling intra-pair skew. Using these additional techniques, cable lengths of up to 15 meters can be achieved for full HD transmission, but these cables are very expensive and generally very bulky and difficult to install and manage.

In multi-media interfaces, such as described herein, there are typically other lower rate auxiliary, configuration and/or control channels in addition to the higher rate digital content channels that may be transmitted between the source and the sink. Link and device management signals fall under this category. In the existing interfaces, often this information is of a bi-directional nature where the receiver and the transmitter time-share a dedicated link for this purpose. The DDC link in the DVI and HDMI interfaces and the auxiliary channel in the DisplayPort interface are examples that require bi-directional communication. These lower rate links are referred to herein, generally, as auxiliary channels. In addition to the bi-directional links, there may be a need for very slow and unidirectional communication as well. The hot plug detect signal is an example of such links in the DVI, HDMI, and DisplayPort interfaces. These types of links are referred to herein as status channels. In addition, a power link may be provided that offers one end (usually the receiver) with the required supply current provided by the other end (usually the transmitter). This calls for a DC supply connection (hereinafter, a supply channel) between the two sides of the link.

SUMMARY

Systems and methods are provided herein for interfacing a first multi-media digital device with a second multi-media digital device. An exemplary method includes the steps of: (i) converting a plurality of differential digital content channels from the first multi-media digital device into a plurality of single-ended digital content channels; (ii) transmitting the plurality of single-ended digital content channels from the first multi-media digital device to the second multi-media digital device via one or more coaxial cables; and (iii) receiving the single-ended digital content channels from the one or more coaxial cables and converting the single-ended digital content channels back into a plurality of differential digital content channels that are supplied to the second multi-media digital device. Additional steps of the exemplary method may include: (i) transmitting one or more auxiliary channels between the first multi-media digital device and the second multi-media digital device; and (ii) combining the one or more auxiliary channels with at least one of the plurality of digital content channels to form a combined channel to be transmitted from the first multi-media digital device to the second multi-media digital device.

Another exemplary method disclosed herein comprises the step of transmitting the plurality of single-ended digital content channels from the first multi-media digital device to the second multi-media digital device via a plurality of coaxial cables. Still another exemplary method disclosed herein comprises the steps of: (i) frequency multiplexing at least one of the single-ended digital content channels with one or more auxiliary channels to form a combined signal; and (ii) transmitting the combined signal to the second multi-media digital device over at least one of the one or more coaxial cables. The aforementioned frequency multiplexing steps may be carried out using a pair of filter hybrids for each of the plurality of single-ended digital content channels, where a first filter hybrid is associated with the first multi-media digital device and a second filter hybrid is associated with the second multi-media digital device. Using these exemplary filter hybrids, a plurality of combined signals may be generated which may comprise one of the single-ended digital content channels and an auxiliary channel.

BRIEF DESCRIPTION OF THE DRAWINGS

FIG. 10 is an example channel-to-spectrum mapping table for the example interfaces shown in FIGS. 8 and 9;

FIG. 11 is an example cut-off frequency table for the example interfaces shown in FIGS. 8 and 9;

DETAILED DESCRIPTION

Figure 3:
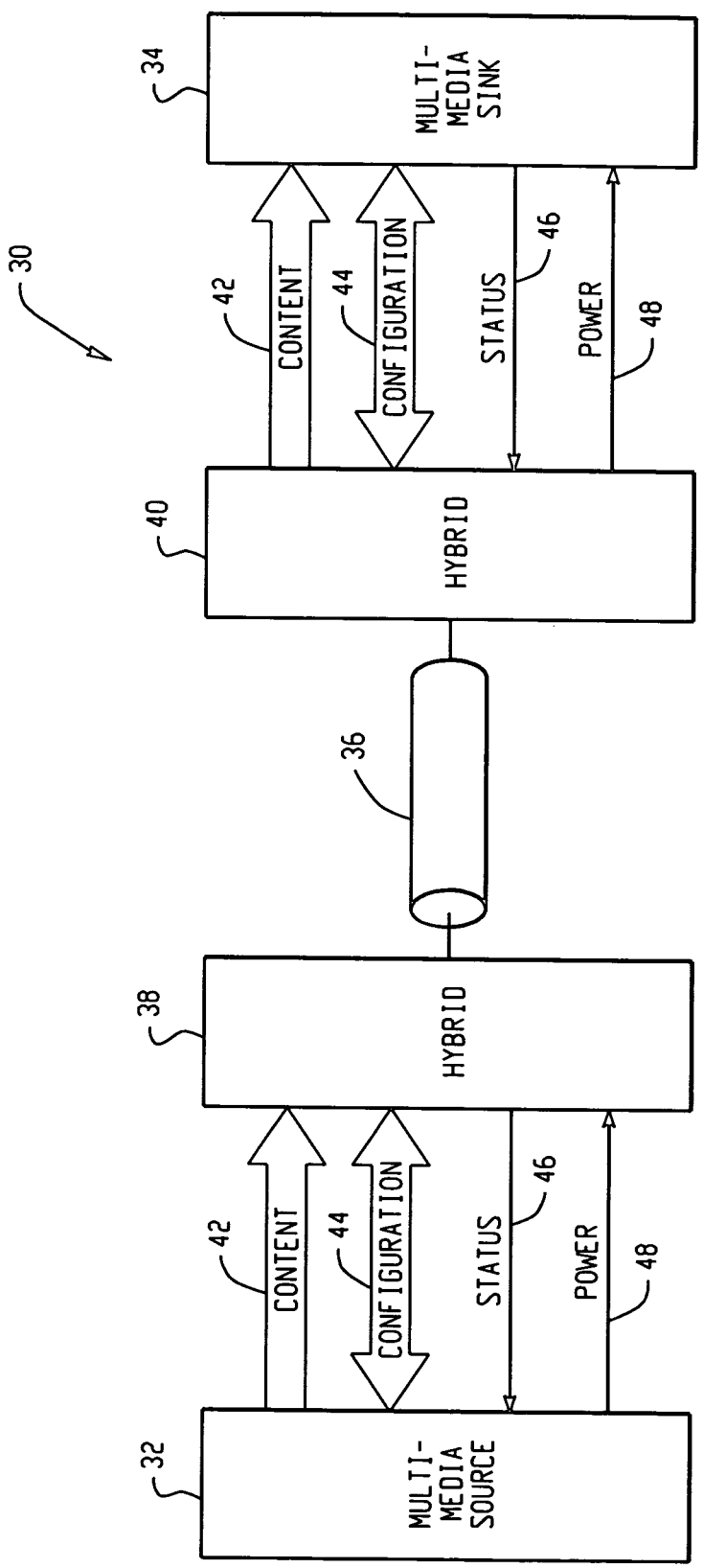
FIG. 3 is a block diagram of an example multi-media digital interface system for transporting digital content and configuration data over a single media.

Turning now to the remaining drawing figures, FIG. 3 is a block diagram of an example multi-media digital interface system 30 for transporting digital content and configuration data over a single media. The interface system of FIG. 3 includes a pair of hybrid circuits 38, 40, which are coupled between a first multi-media digital device 32 and a second multi-media digital device 34. In this figure, the first multi-media digital device 32 is a multi-media source and the second multi-media digital device 34 is a multi-media sink. For example, the multi-media source 32 may be a high-definition video disk player and the multi-media sink 34 may be a high-definition television display. The hybrid circuits 38, 40 are, in turn, coupled to one another via a single media 36, which may be a coaxial cable.

The multi-media source device 32 generates one or more differential digital content channels 42, which may be, for example, transition-minimized differential signals (TMDS), such as are generated from an HDMI or DisplayPort source interface. In addition, the source device may generate one or more auxiliary channels, such as configuration channel 44 and power channel 48. Although not shown in FIG. 3, the source device 32 may also generate a clock channel, which is typically a high frequency channel carrying timing data related to the multi-media data in the one or more digital content channels 42. Thus, the clock channel is a form of digital content channel.

The configuration channel may be any type of data channel which is used to transport configuration and/or control information between the first and second multi-media digital devices. For example, the Display Data Channel (DDC) and Consumer Electronics Channel (CEC) are examples of this type of configuration channel 44. The configuration channel 44 can be unidirectional or bidirectional, depending on the implementation of the interface system.

The status channel is typically implemented as a unidirectional channel, although it is possible that this too could be a bidirectional link. As an example, unidirectional status channels may be used to carry hot-plug detect information from the second multi-media digital device 34 to the first multi-media digital device 32 or may be used, for example, to transport enhanced display identification data (EDID). The power channel is typically utilized to provide DC power to the circuitry in the first and second hybrid circuits 38, 40.

The hybrid circuits 38, 40 provide the electrical interface between the multiple content and auxiliary channels 42, 44, 46 and 48 and the single media 36. These hybrid circuits may take many forms, just a few of which are described in more detail herein. In an exemplary embodiment described below, the hybrid circuit coupled to the multi-media source 32 includes circuitry for converting the differential digital content channels 42 from the multi-media source 32 into a plurality of single-ended digital content channels for transmission over the single media 36. The hybrid circuit coupled to the multi-media sink 34 receives these single-ended digital content channels from the single media 36 and converts them back into a plurality of differential digital content channels 42, which are supplied to the multi-media sink 34. The hybrid circuits 38, 40 may also include circuitry for combining the digital content channels 42 with the auxiliary channels 44, 46, 48, and for separating the auxiliary channels from the content channels depending upon whether the auxiliary channel is unidirectional or bidirectional. In one exemplary embodiment, the hybrid circuits utilize frequency multiplexing/demultiplexing to combine/separate the content channels and the auxiliary channels.

Although shown as a single media 36 in FIG. 3, in other exemplary embodiments the interface system may utilize a plurality of media to transport the digital content channels and the auxiliary channels. For example, in one embodiment, a separate media is used to transport each of the plurality of single-ended digital content channels between the first and second multi-media devices 32, 34. Each of these digital content channels may then be combined with one or more auxiliary channels via the hybrid circuitry 38, 40. The transport media 36 may include copper, such as coaxial and twisted-pair cables, as well as non-copper transmission media.

Figure 4:
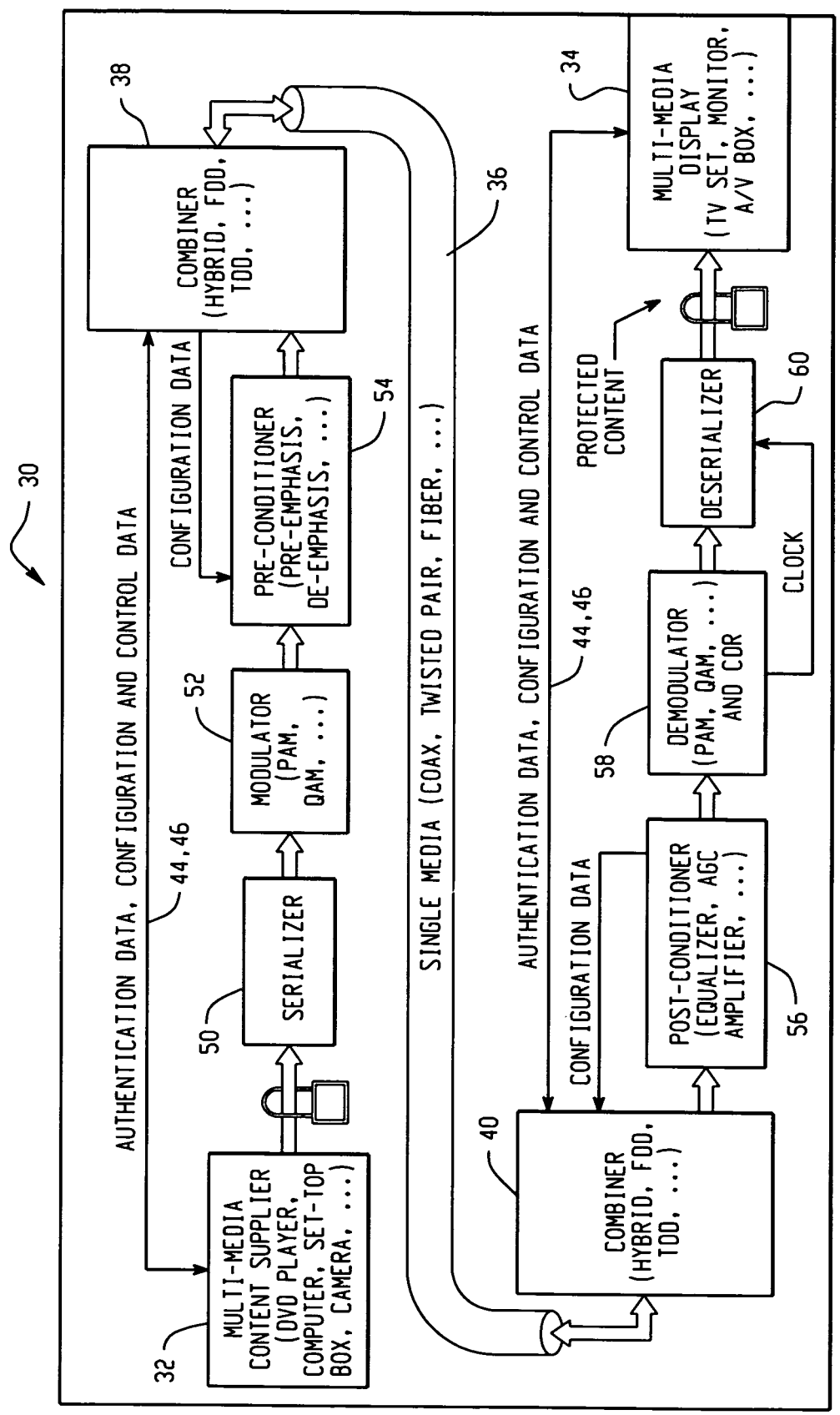
FIG. 4 is a more detailed block diagram of an exemplary multi-media digital interface system.

FIG. 4 is a more detailed block diagram 30 of an exemplary multi-media digital interface system. This system 30 couples a first multi-media digital device 32 to a second multi-media digital device 34 through a single media 36. The first multi-media digital device 32 is a multi-media content supplier, such as a DVD player, a computer, a set-top box, a camera, etc., and the second multi-media digital device 34 is a display, such as a television or a computer monitor. As noted above, the single media 36 in this example may be a coaxial cable, twisted pair, or fiber optic connection, to name a few example media types.

Positioned on the transmit side between the first multi-media digital device 32 and the single media 36 in this exemplary system are serializer 50, modulator 52, pre-conditioner 54 and combiner circuitry 38. On the display side of the system, a combiner 40, post-conditioner 56, demodulator 58, and deserializer 60 couple the single media 36 to the second multi-media digital device 34. The operation of these exemplary circuit elements is described in more detail below.

In the system shown in FIG. 4, a multi-media content supplier 32 outputs content protected data to a serializer unit 50. The content protected data preferably comprises a plurality of differential digital content channels, such as the TMDS content channels of an HDMI signal, which are converted into a plurality of single-ended digital content channels and then serialized into a single bit stream by the serializer 50. By converting the content channels from differential to single-ended signals, and then serializing the data into a single bit stream, all of the content channels can be transported over a single media 36, such as a coaxial cable, thus eliminating the need for more complex multi-twisted pair cables, such as typically found in HDMI and DisplayPort applications.

Figure 1:
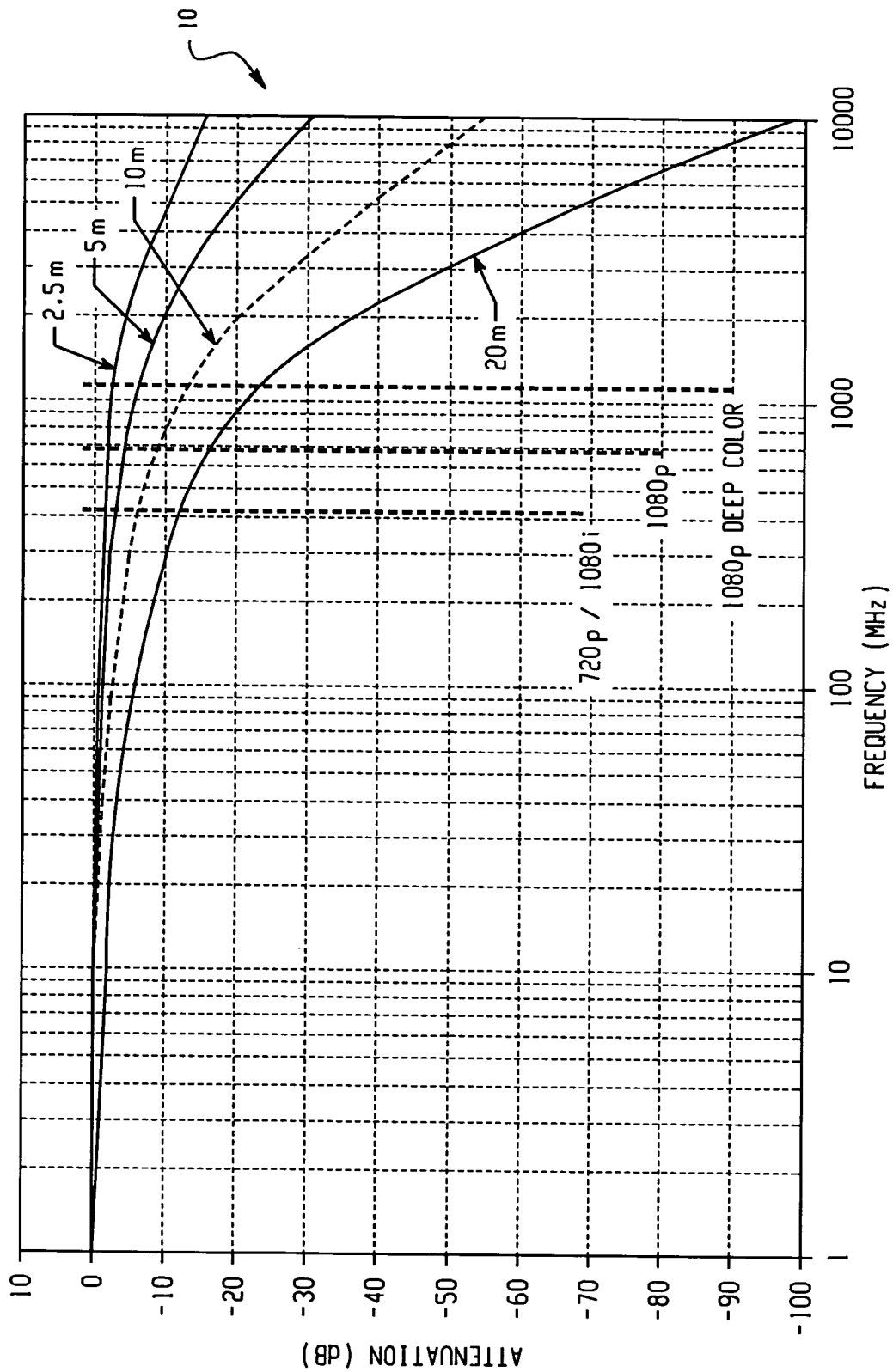
FIG. 1 is a plot showing the typical loss characteristics of an HDMI, DVI, or DisplayPort type cable.
Figure 2:
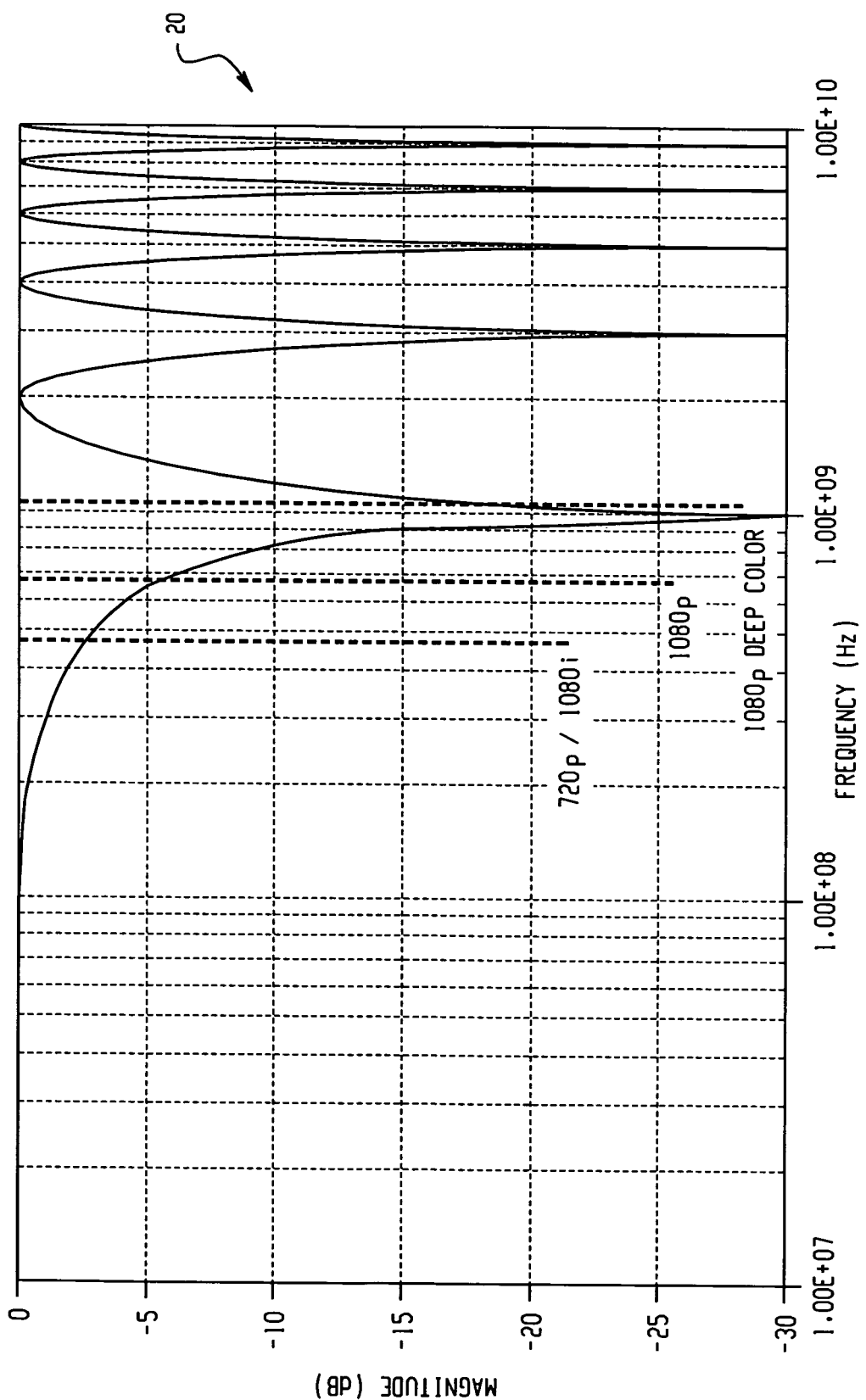
FIG. 2 is a plot showing the typical cable attenuation response as a function of intra-pair skew of an HDMI, DVI, or DisplayPort type cable.
Figure 5:
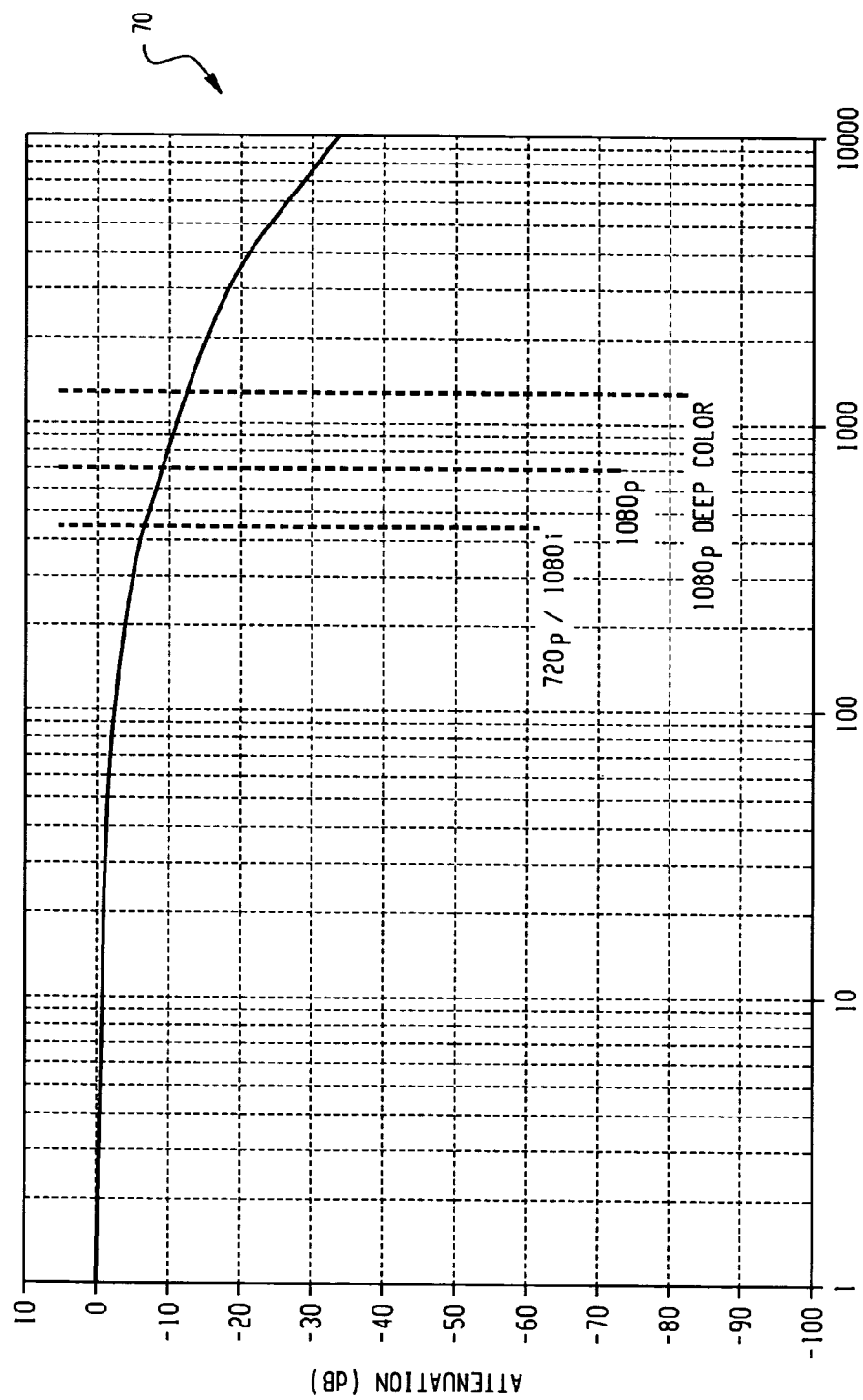
FIG. 5 is a plot showing the typical loss characteristics of a single media coaxial cable.

FIG. 5 is a plot showing the typical loss characteristics of a single media coaxial cable. It can be seen that the cable attenuation at 30 meters of sub-miniature RG59/U coaxial cable is roughly equivalent to 10 meters of typical HDMI cable as shown in FIG. 2, a three times improvement in performance. Thus, in addition to simplifying the physical interface, the system shown in FIG. 4 provides much better electrical performance at longer cable lengths.

Also provided to the serializer from the multi-media source 32 may be a clock channel and one or more auxiliary data channels. This serialized bit-stream is then modulated 52 and pre-conditioned 54 based on the channel characteristics of the single media 36. Various modulation schemes can be used in this system, such as PAM, QAM, etc., in order to maximize data throughput over the single media. In addition, the modulation can take place either before or after the auxiliary channels are combined with the content channels by the combiner 38.

Examples of pre-conditioning 54 may include pre-emphasizing and de-emphasizing, which essentially shape the spectrum of the signal to better match the channel response. For more precise operation, the pre-conditioner 54 typically needs some information from the transmission channel. To accomplish this, channel estimation data is fed either directly from the post-conditioner 56 or between the multi-media source 32 and the pre-conditioner 54 (on the transmit side) and the post-conditioner 56 and multi-media sink 34 (on the display side) over a unidirectional or bidirectional auxiliary back channel 44. Authentication data 46 may also be carried on this or another auxiliary channel. In this exemplary system 30, the information carried over the auxiliary back channel may include encryption data for authentication purposes 46, configuration data 44, such as channel estimation and display EDID information, and possibly other status data, such as hot plug detect information.

After modulation and pre-conditioning, the serialized bit stream on the transmit side of the system 30 is then combined or mixed with the authentication, configuration and control data 44, 46 by combiner circuitry 38 into a single channel of information for transmission over the single media 36. As noted previously, the modulation function may alternatively take place after the combiner 38. Frequency multiplexers, time multiplexers, and/or other forms of hybrid circuits may be used for this combining function. Other methods of combining the content channels with the auxiliary channels may also be employed.

Upon reception, the auxiliary back channel data is separated from the content data via combiner circuitry 40, and distributed to the post-conditioner 56 and multi-media display 34, much in a similar, but reverse fashion to the transmitter-side circuitry. The receiver may include a post-conditioner 56, such as a channel equalizer and AGC amplifier. To apply optimum equalization, channel estimation and adaptive equalization is preferred. The adaptive mechanism may be split between the pre- and post-conditioners 54, 56. Once properly conditioned, the received signal is then demodulated 58 and the clock and data are extracted by a clock and data recovery (CDR) unit. The recovered serial data is then converted back to parallel by a deserializer 60, converted from single-ended to differential signals, and then provided to the multi-media display 34.

In the example system 30 shown in FIG. 4, increased throughput is possible by employing more complicated modulation schemes than the existing binary signaling adopted in some of the current multi-media interfaces. For example, different variations of multi-level modulation schemes, such as PAM and QAM, are examples of technologies that can enable compressing high-bandwidth information into the smaller bandwidth of the transmission channel. Squeezing more data in less bandwidth enables high quality multi-media connectivity over longer distances and for higher resolution contents, as well as the ability to multiplex several streams over the same transmission link. Note that the existing or derivations of binary signaling schemes are not excluded and may still be used when found advantageous.

In consumer electronics (CE) connection applications, the existence of an auxiliary back channel, as shown in the system of FIG. 4, is typically required to send and receive data, such as configuration information in both directions. The technology described herein extends the use of the single media for establishing this connectivity between CE devices such as DVD players, A/V receivers, DVRs, and PVRs. A typical application would be a unified single-cable connection between a DVD player and a TV set that carries the video and audio information from the DVD player to the TV set, as well as configuration and control information between both devices and in both directions. Examples of bidirectional information include the authentication data that both devices handshake before a secure link is established, as well as access of the DVD player to the audio and video capabilities and formats supported by the TV set (EDID information) in order to properly condition the content.

Figure 6:
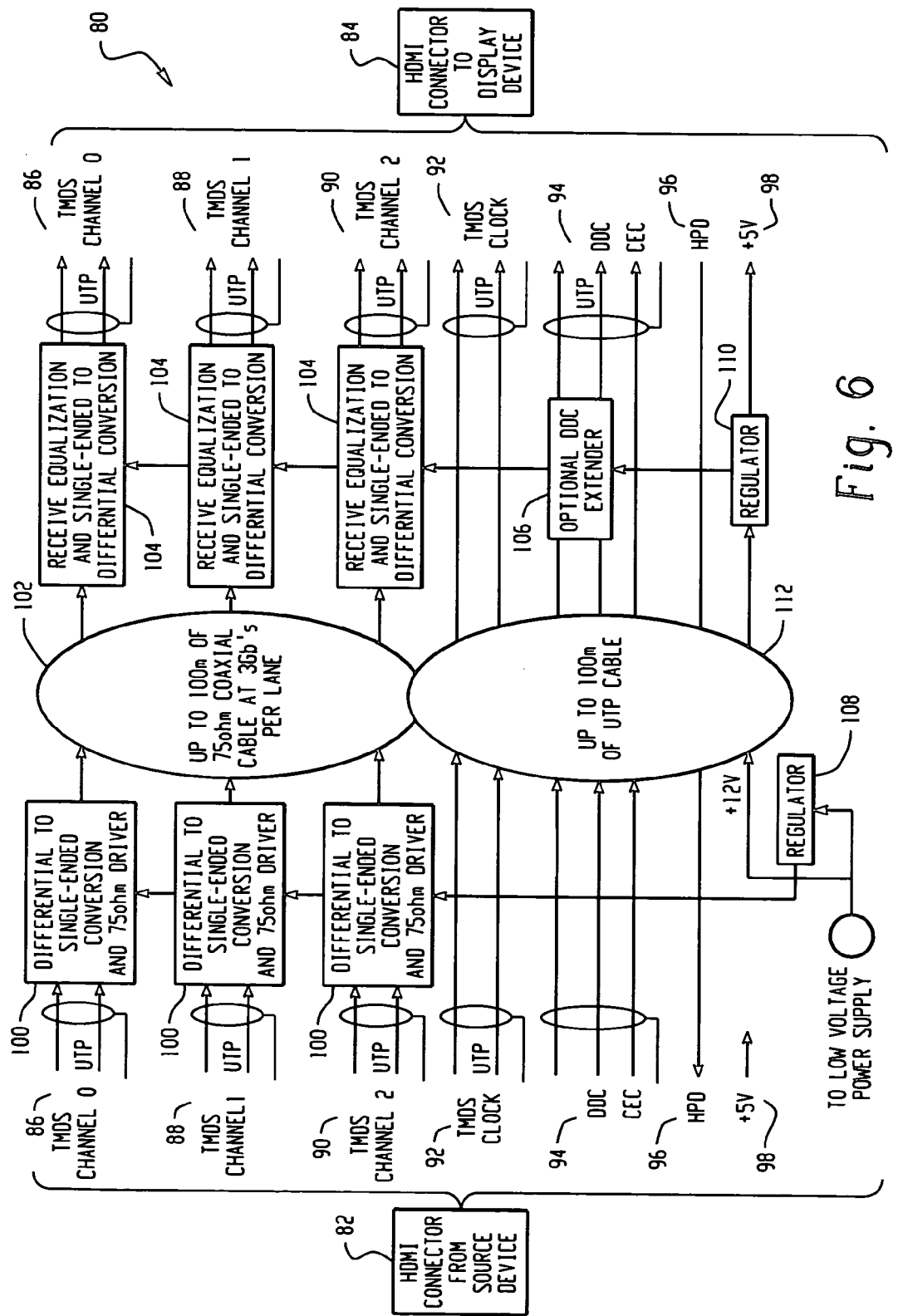
FIG. 6 is a block diagram of another example multi-media digital interface for transporting digital content over a plurality of single-ended media.

FIG. 6 is a block diagram 80 of another example multi-media digital interface for transporting digital content over a plurality of single-ended media. More particularly, this example interface shown in FIG. 6 illustrates a long-reach HDMI active cable assembly. An active cable assembly is one that includes the circuitry for performing differential to single-ended conversion 100 and single-ended to differential conversion 104 within the cable assembly itself. This type of implementation will typically include power conversion circuitry 108 to supply 5 volt DC power to the active electronics 100, 104, 106 in the cable assembly. By replacing the differential, twisted pair copper connections with single-ended, coaxial connections 102, significant performance improvements, especially with respect to maximum cabling length, may be achieved using this active cable assembly. This performance improvement is primarily due to the elimination of intra-pair skew effects and improved frequency response of coaxial cable as compared to the existing twisted pair solution that is used in present HDMI connections.

Although an active cable assembly is shown in FIG. 6, this is just one example implementation of the technology described in this patent document. Other implementations are also possible, such as, for example, providing a passive cable assembly, which is interfaced to the multi-media equipment 82, 84 through one or more external black boxes housing the active electronics shown in FIG. 6. In another implementation, the active electronics for performing the differential to single-ended conversion 100 and single-ended to differential conversion 104 are housed within the multi-media equipment itself. In this later example implementation, the multi-media equipment may be provided with a standard differential-type output connector, such as the commonly-used HDMI connector found in present equipment, and the equipment may also include one or more coaxial cable connectors for providing single-ended output signals corresponding to the differential signal lanes in the HDMI connector.

Turning back to the details of FIG. 6, the active cable assembly is connected between a first multi-media source device 82, located on the left-hand side of the figure, which may be a DVD player, for example, and a second multi-media display device 84, located on the right-hand side of the figure, which may be an LCD display. In this example implementation, the active electronics 100, 104 for converting the HDMI differential signals to and from single-ended signals are integrated into the cable assembly. As noted above, these electronic devices may also be placed into a separate interface device, or may be integrated into the multi-media equipment itself.

The example digital interface shown in FIG. 6 includes three TMDS data channels, labelled TMDS Channel 0 (86), TMDS Channel 1 (88), and TMDS Channel 2 (90). The interface also includes a TMDS clock signal 92, a DDC/CEC control signal pair 94, a hot-plug detect (HPD) signal 96, and a +5V DC power line 98. These signals may be output from the multi-media source device and input to the display device using standard HDMI type connectors 82, 84.

As shown in FIG. 6, the active cable assembly includes differential to single-ended converters 100 on the transmitter side of the cable, preferably one such converter on each of the content data channels (TMDS signals), for converting the differential signals into single-ended signals, which are then provided to a 75 Ohm driver circuit for driving up to 100 meters of coaxial cable 102 at 3 Gb/sec to the receive end of the active cable assembly. On the receive side of the active cable assembly, a plurality of optional receive equalization circuits provide a measure of equalization for the received single-ended signals, and corresponding single-ended to differential converters 104 convert the single-ended signals back into differential signals that are provided to the display device HDMI connector 84.

Although the TMDS clock signal 92 in FIG. 6 is shown as being twisted pair UTP cabling between the source and display devices, alternatively the TMDS clock signal 92 may be converted from differential to single-ended form to improve its transmission characteristics over longer cable lengths and then transmitted over a coaxial or other single-ended transmission medium. The clock signal 92 in this embodiment may be transmitted over a separate single-ended transmission medium from the content data channels 86, 88, 90, or it may be combined with one of the content data channels and transmitted over a common single-ended transmission medium.

As noted above, an optional DDC extender circuit 106 may also be included in the active cable assembly shown in FIG. 6 to extend the reach of the DDC/CEC control channel 94. This DDC extender circuit 106, for example, may be of the type disclosed in U.S. patent application Ser. No. 10/388,916, titled "Digital Communication Extender System and Method," which is assigned to the assignee of this application, and incorporated herein by reference. This auxiliary configuration channel may be transmitted over a separate UTP cable, as shown in FIG. 6, or it may be combined with one of the content data channels and transmitted over the single-ended transmission medium. In this case, appropriate combiner circuitry should be integrated into the active cable assembly, similar to that described above with respect to FIG. 4 and/or below with respect to FIGS. 7-15.

Figure 7:
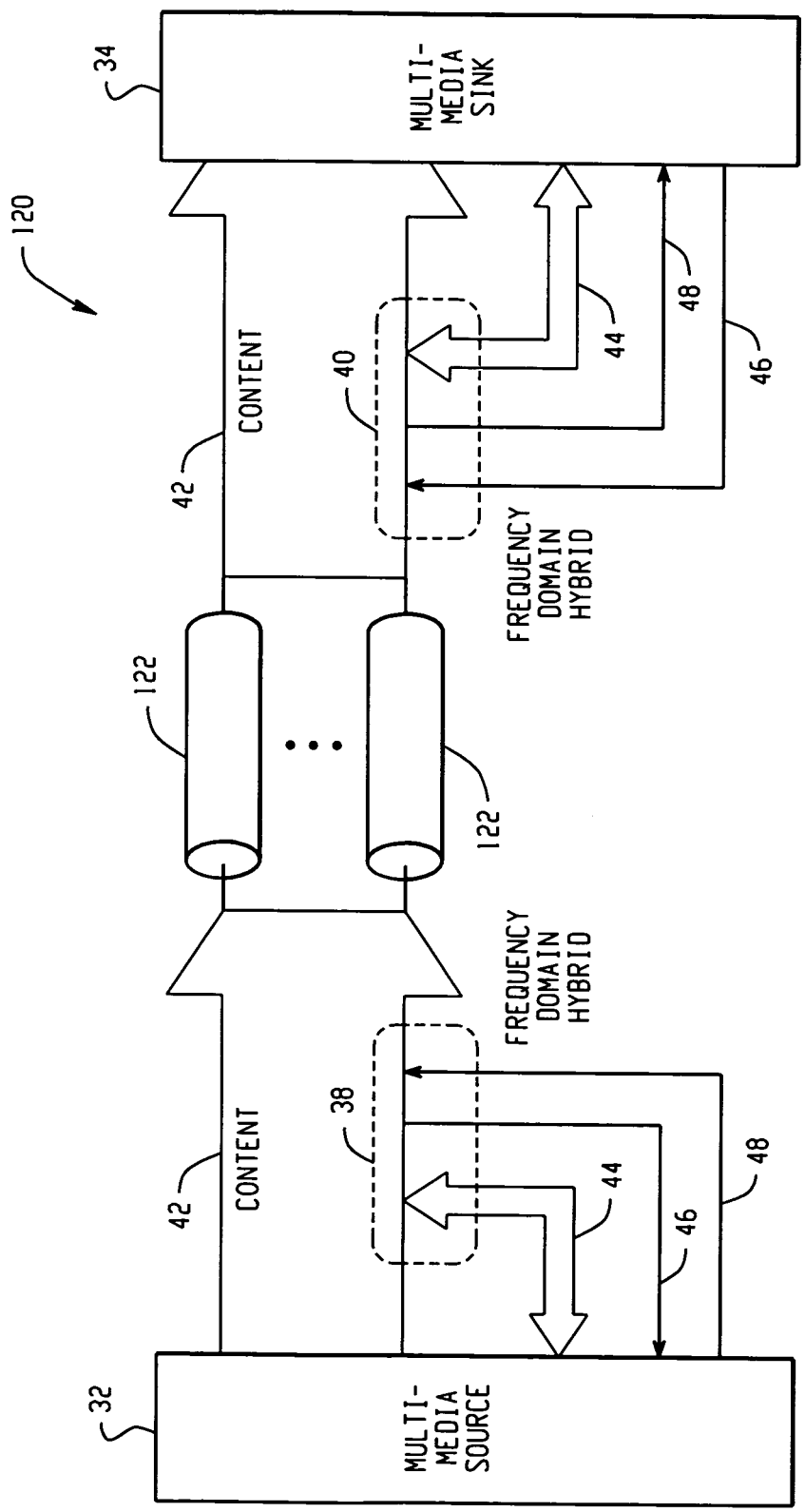
FIG. 7 is a block diagram of another example multi-media digital interface for transporting digital content and configuration data over a plurality of single ended media using frequency multiplexing.

FIG. 7 is a block diagram 120 of another example multimedia digital interface for transporting digital content and configuration data over a plurality of single ended media 122 using frequency multiplexing. Although frequency multiplexing is described with reference to the example of FIG. 7, it should be understood that other forms of combining the digital content channels 42 with the auxiliary channels 44, 46, 48 may also be utilized with this system interface.

As shown in FIG. 7, a multi-media source device 32, such as a DVD player, is coupled to a multi-media sink device 34, such as a high-definition display, through an interface system comprising transmit and receive-side frequency domain hybrids 38, 40 and a plurality of single-ended media 122. The one or more frequency domain hybrids 38 on the transmit side of the interface combine the one or more digital content channels 42 (which may include the high-frequency clock channel) with the auxiliary channels 44, 46, 48, depending upon the precise implementation. The auxiliary channels may include configuration and control channels 44, status channels 46 and supply channels 48. After combining the signals in the frequency domain hybrids 38, the combined signals are transmitted over the plurality of single ended media 122 to the receive side of the interface. On the receive side of the interface, one or more frequency domain hybrids 40 de-combine or demultiplex the auxiliary channels 44, 46, 48 from the digital content channels 42, which are then collectively routed to the multi-media sink device 34.

In the example system interface shown in FIG. 7, the auxiliary and content channels are frequency multiplexed using the frequency domain hybrids 38, 40. Other forms of multiplexing/combining may also be used in this interface, such as time division multiplexing, etc. As described in more detail in further example implementations set forth below, each of the frequency domain hybrids may include a high-pass input for receiving a high-frequency digital content channel (or a high-frequency digital clock channel), and one or more low pass or band pass inputs for receiving one or more unidirectional or bidirectional auxiliary channels 44, 46, 48. The signals applied to these inputs are then multiplexed in the hybrid 38 and provided to the media 122 in the form of a combined frequency-multiplexed output signal. On the receiver side, the hybrid 40 is inverted from the hybrid 38 on the transmitter side, such that it comprises a single input and a plurality of outputs corresponding to the high-frequency digital content channel 42 and the one or more lower frequency auxiliary channels 44, 46, 48. The functionality provided by these hybrids 38, 40 may be located within the source 32 and sink 34, or may be located within a housing external to the source 32 and sink 34, or may be located within an active cable assembly coupling the source 32 to the sink 34.

Figure 8:
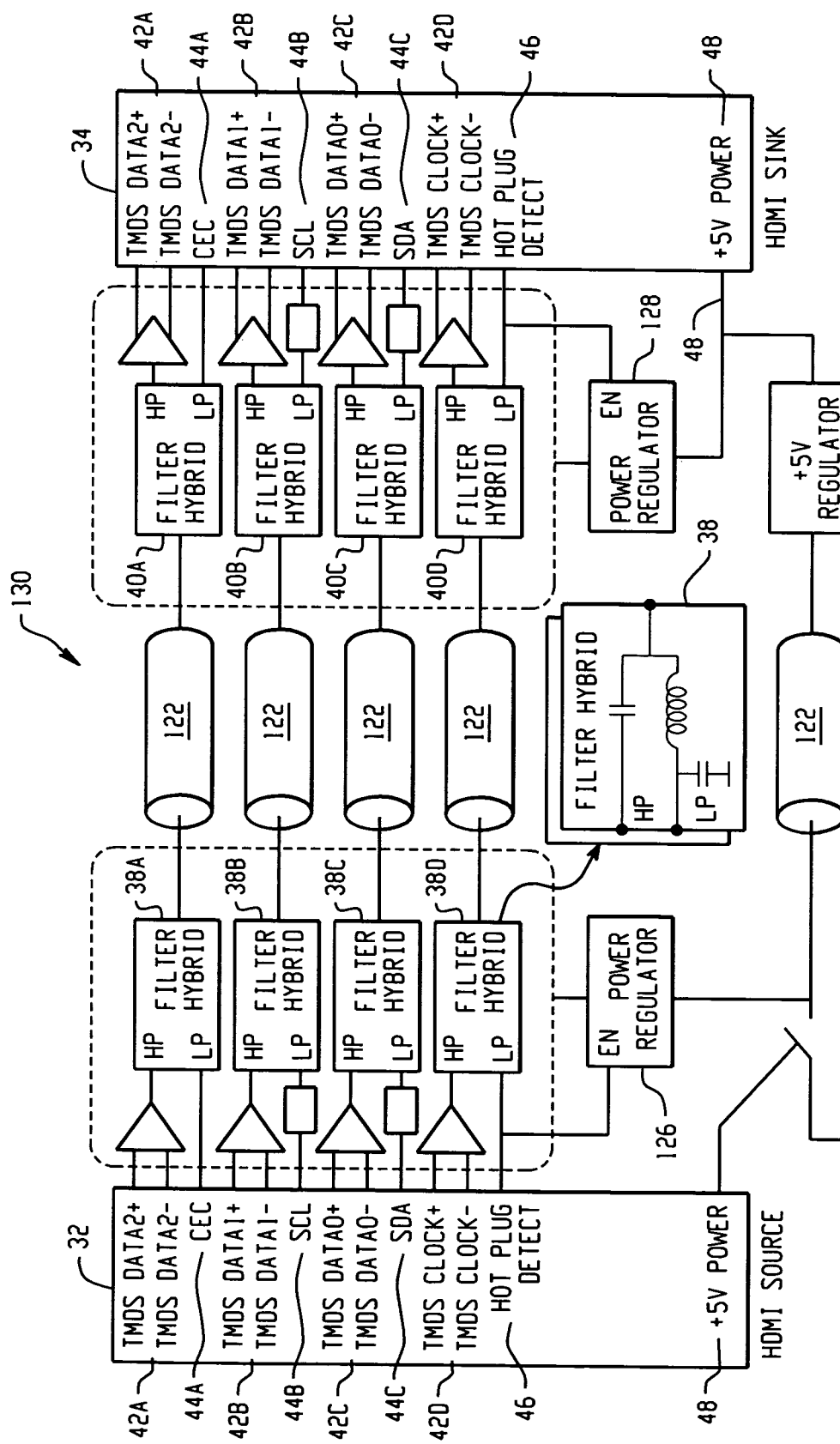
FIG. 8 is a more detailed block diagram of the example multi-media digital interface shown in FIG. 7 configured to transport HDMI content and configuration data over a plurality of single-ended media using frequency multiplexing.

FIG. 8 is a more detailed block diagram 130 of the example multi-media digital interface shown in FIG. 7 configured to transport HDMI content and configuration data channels over a plurality of single-ended media using frequency multiplexing. On the transmit side of the interface, a plurality of filter hybrids 38A, 38B, 38C, 38D are used to frequency multiplex the HDMI content channels (including the three TMDS data channels and the TMDS clock channel) with the CEC, SCL, SDA and hot plug detect (HPD) auxiliary channels. And on the receive side of the interface a similar plurality of filter hybrids 40A, 40B, 40C, 40D are used to demultiplex the content channels from the auxiliary channels.

The first filter hybrid 38A on the transmit side of the interface receives a single-ended version of the differential TMDS DATA2 content signal 42A on its high pass input and the CEC auxiliary channel 44A on its low pass input. These two signals 42A, 44A are then frequency multiplexed in the filter hybrid 38A, which produces a combined frequency multiplexed signal at its output. This combined signal is then transported over the coaxial medium 122 to the receive side of the interface where it is received by the corresponding filter hybrid 40A. The first receive filter hybrid 40A demultiplexes the single-ended TMDS DATA2 signal onto its high pass output and the CEC auxiliary channel onto its low pass output. The single-ended TMDS DATA2 signal is subsequently converted back into a differential signal and then provided to the HDMI sink 34.

In a similar fashion, the TMDS DATA1 content signal 42B is converted to single-ended, combined with the SCL auxiliary channel 44B in the second transmit side filter hybrid 38B, and then transported over a separate coaxial medium 122 to the receive side filter hybrid 40B. The second receive side filter hybrid 40B receives the combined TMDS DATA1 content signal and SCL auxiliary channel 44B and demultiplexes these signals for provision to the HDMI sink device 34. The TMDS DATA0 content signal 42C is likewise transported over a separate coaxial medium 122 in a combined form with the SDA auxiliary channel 44C, and the TMDS CLOCK signal 42D is transported with the HPD status channel 46.

Also shown in FIG. 8 is an optional power channel separate from the combined content/auxiliary channel mediums 122 for providing power from the HDMI source 32 to the HDMI sink 34, and for providing power to the active electronics of the multi-media interface, such as the differential to single-ended converters on the transmit side of the interface and the equalizer and single-ended to differential converters on the receive side of the interface. Regulated power to these electronics may be provided on the transmit side by power regulator 126 and on the receive side by power regulator 128. These regulators 126, 128 may be enabled by the hot plug detect signal 46. The 5V power is also directly provided to the HDMI sink to establish a seamless 5V connection between the HDMI source and sink as per the HDMI link requirement.

Figure 9:
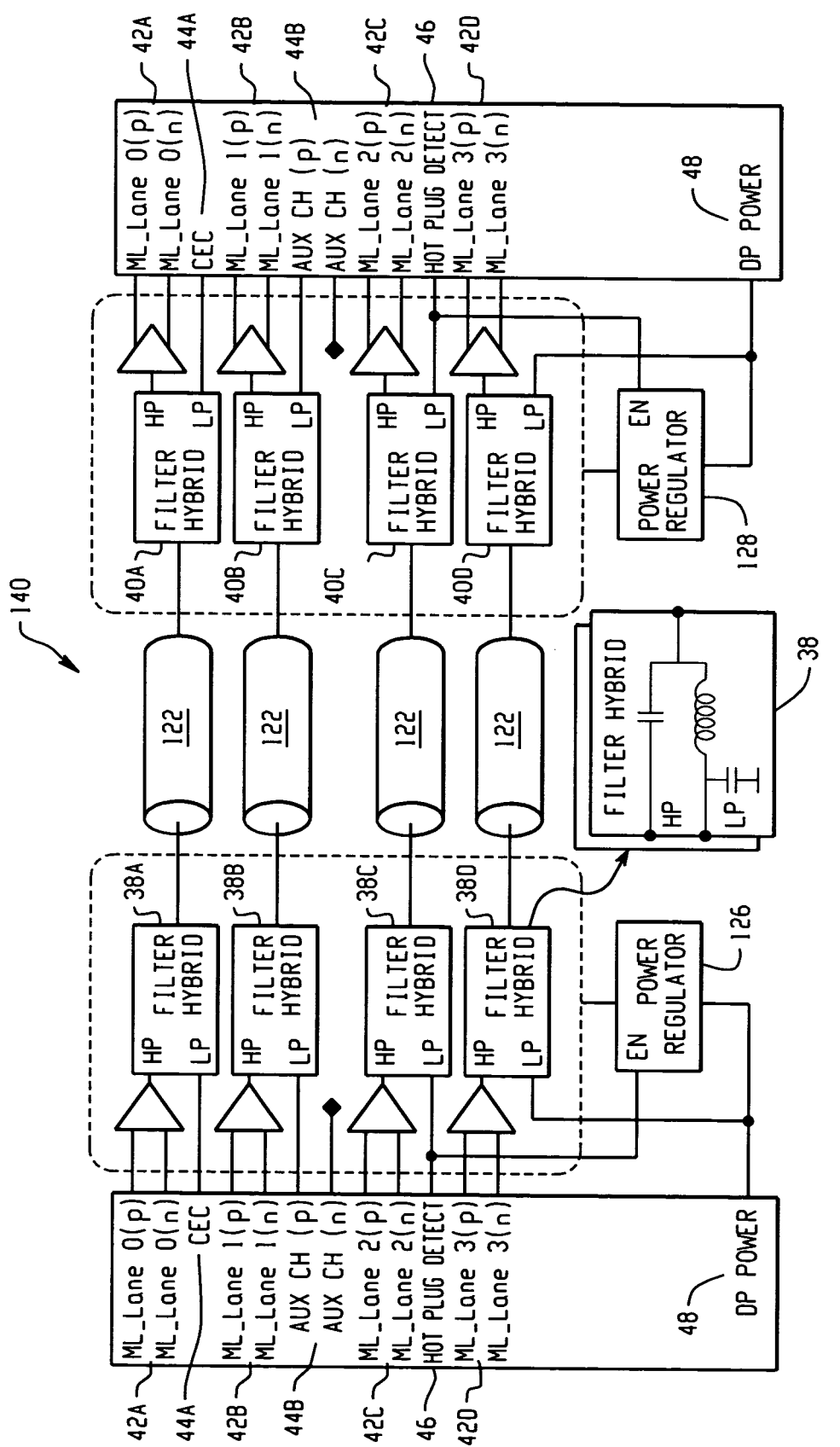
FIG. 9 is a more detailed block diagram of the example multi-media digital interface shown in FIG. 7 configured to transport DisplayPort content and configuration data over a plurality of single-ended media using frequency multiplexing.

FIG. 9 is a more detailed block diagram 140 of the example multi-media digital interface shown in FIG. 7 configured to transport DisplayPort content and configuration data over a plurality of single-ended media using frequency multiplexing. This example is almost identical to the example HDMI interface shown in FIG. 8, except that the optional power channel is combined with one of the digital content channels 42D and transported over a combined channel medium 122. In this configuration, the DisplayPort ML_LANE0 content signal 42A is combined with the CEC auxiliary channel. The DisplayPort ML_LANE1 content signal 42B is combined with the HPD signal 46. The DisplayPort ML_LANE2 content signal 42C is combined with the AUX CH 44. And the DisplayPort ML_LANE3 content signal 42D is combined with the power channel 48. Otherwise, the methodology for converting from differential to single-ended and vice versa, and combining the content signals 42 with the auxiliary channels 44, 46, 48 in this example is done using the same frequency multiplexing hybrids 38, 40 discussed above in connection with FIG. 8.

The example multi-media interface systems shown in FIGS. 8 and 9 utilize an interchangeable and reversible frequency multiplexing/demultiplexing filter hybrid 38, 40 that provides one high-pass input, one low-pass input and one composite output in a first configuration 38, and can be reversed to provide the second configuration 40. In the first configuration 38 the hybrid 38 performs a multiplexing function while in the second configuration 40 the hybrid 40 performs a demultiplexing function. The output in the first configuration 38 encompasses all the inputs lined up in frequency in a frequency-multiplexed manner. Channel mappings to the multi-media interface depends on the specific application, but one example scenario is to assign the high-pass spectrums to the main (or content) channels and the low-pass spectrums to the corresponding auxiliary channels as explained above.

FIG. 10 is an example channel-to-spectrum mapping table for the example interfaces shown in FIGS. 8 and 9. The top portion of the mapping table shows the five-cable HDMI interface set forth in FIG. 8. In this example interface, the frequency multiplexing hybrids 38, 40 include high-pass and low-pass inputs for the respective content channels (DATA2, DATA1, DATA0 and CLOCK) and the auxiliary channels (CEC, SCL, SDA and HPD). There is no multiplexing on the separate power cable (Cable 5) in this example scenario. The next portion of the table immediately below the HDMI interface is the four-cable DisplayPort interface set forth in FIG. 9. Similar to the HDMI example shown in FIG. 8, in the multi-cable DisplayPort example shown in FIG. 9, the frequency multiplexing hybrids 38, 40 include only high pass and low pass inputs.

Just below the multi-cable DisplayPort example in the mapping table are two alternative single-cable DisplayPort mappings. In the first single-cable example, there is no power channel and therefore the single content channel (Lane 0) is multiplexed with the AUX channel and the HPD channel using a first band pass input and a low pass input on the frequency multiplexing hybrids 38, 40. In the second single-cable example, which includes a power channel, the single content channel (Lane 0) is multiplexed with the AUX channel, the HPD channel and the power channel using first and second band pass inputs and a low pass input on the frequency multiplexing hybrids 38, 40.

Depending on the application and the supported options, the cut-off frequencies of the various filters that make up the frequency multiplexing hybrids 38, 40 will vary. FIG. 11 is an example cut-off frequency table for the example interfaces shown in FIGS. 8 and 9 and the two single-cable DisplayPort interfaces discussed in connection with FIG. 10. The numerical values set forth in FIG. 11 represent examples and are only meant to provide insight into what a typical solution may look like. The exact cut-off frequencies of the filters depend on a number of factors, including the number of multiplexed channels, the required isolation between them, the signal levels, and other practical considerations that are driven primarily by the application.

Figure 12A:
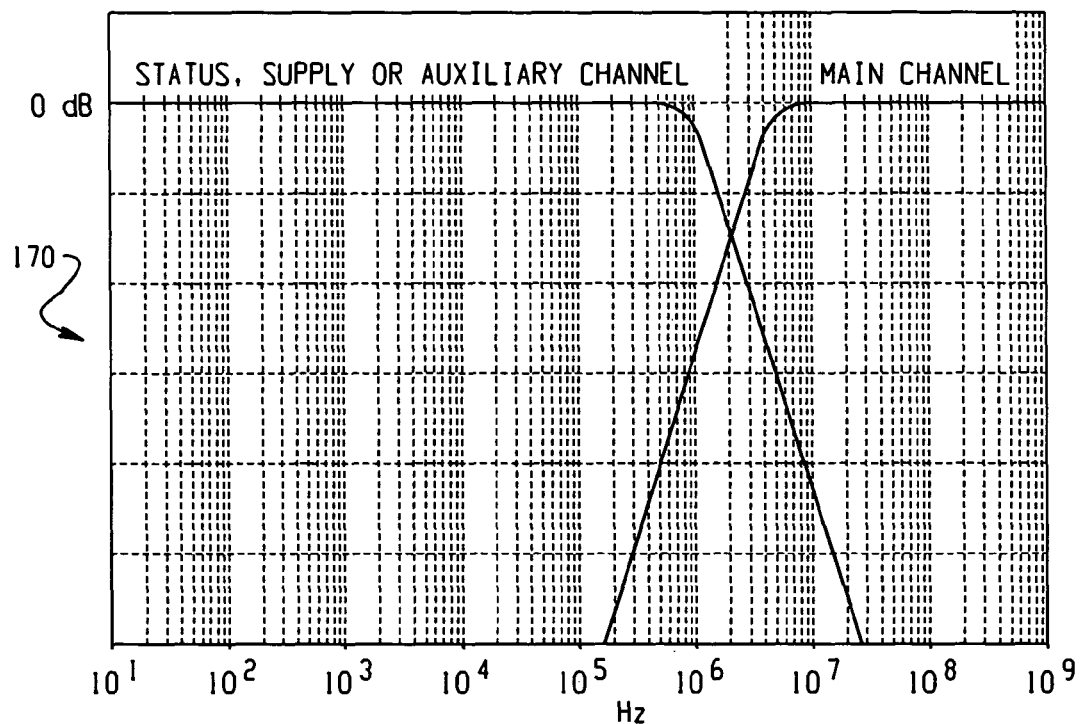
FIGS. 12A and 12B are example plots showing the frequency multiplexing in the plurality of single-ended media for the example HDMI interface shown in FIG. 8 and the DisplayPort interface shown in FIG. 9.
Figure 12B:
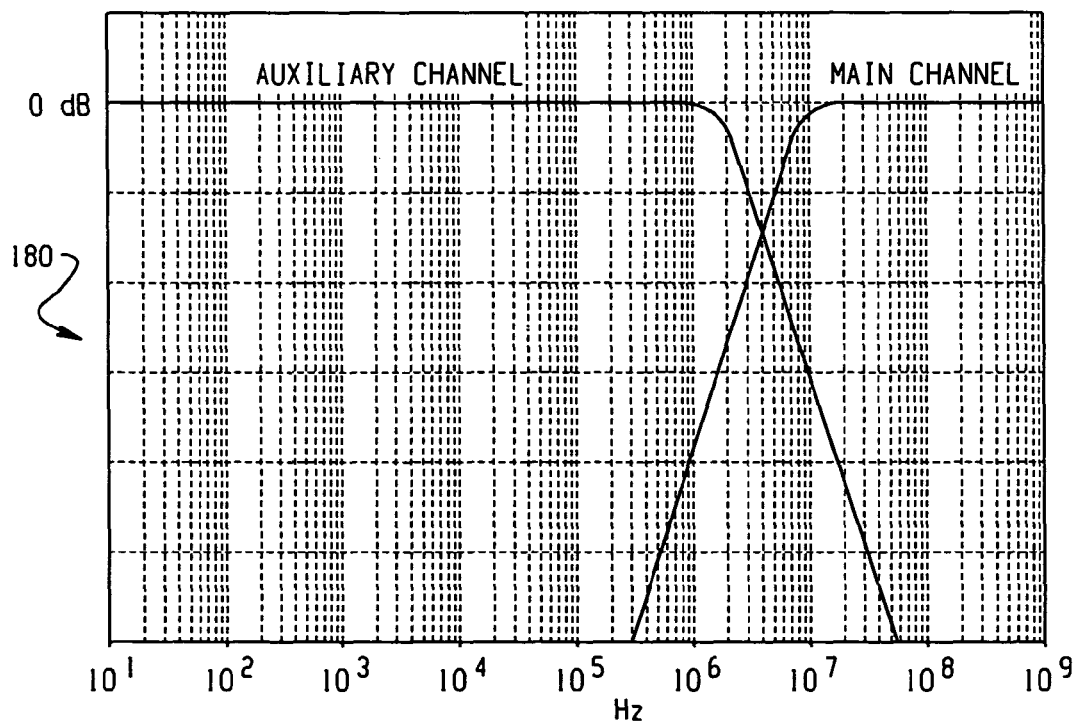

FIGS. 12A and 12B are example plots 170, 180 showing the frequency multiplexing in the plurality of single-ended media for the example HDMI interface shown in FIG. 8 and the example DisplayPort interface shown in FIG. 9. The plot 170 in FIG. 12A shows the multiplexing of a main content channel with one of the status, supply or auxiliary channels. The plot 180 in FIG. 12B shows the multiplexing of a main content channel with the AUX channel of the DisplayPort interface, which typically requires a larger bandwidth.

Figure 13A:
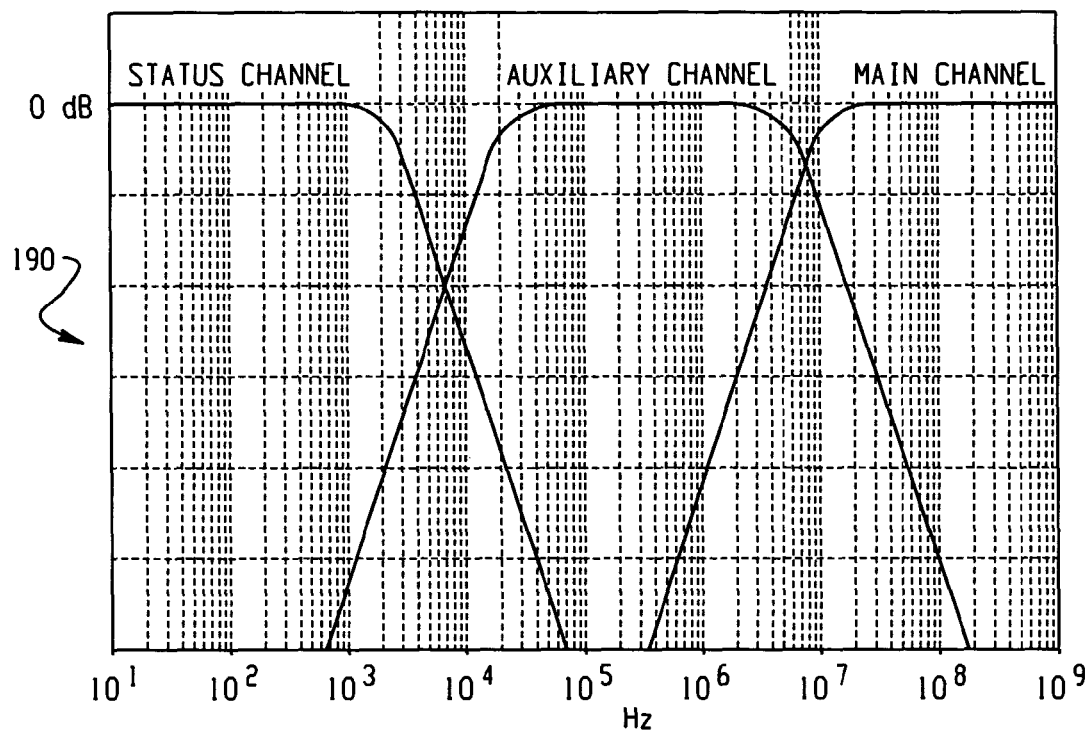
FIGS. 13A and 13B are example plots showing the frequency multiplexing in the DisplayPort over single cable interfaces described at the bottom of the table in FIG. 10.
Figure 13B:
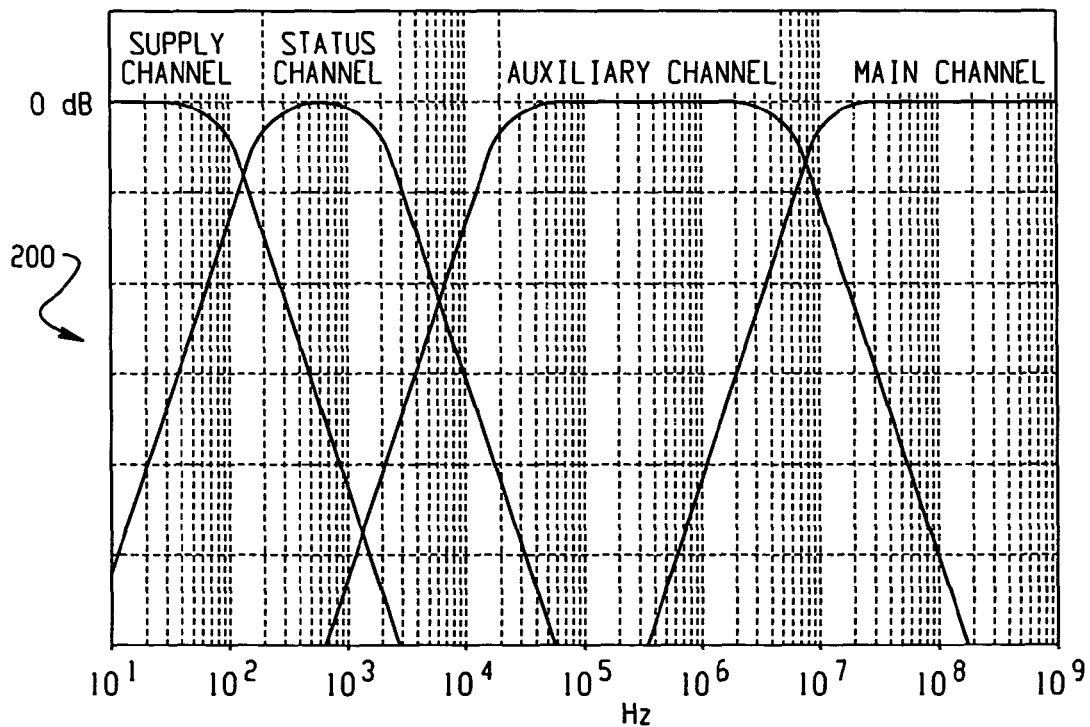

FIGS. 13A and 13B are example plots 190, 200 showing the frequency multiplexing for the two example single-cable DisplayPort interfaces identified in connection with the mapping table of FIG. 10. The first plot 190 shown in FIG. 13A shows the example without the power channel in which the main (or content) channel is multiplexed with an auxiliary channel (band pass) and a status channel (low pass). And the second plot 200 shown in FIG. 13B shows the example with the power channel in which the main channel is multiplexed with an auxiliary channel (first band pass), a status channel (second band pass) and the power channel (low pass).

Figure 14A:
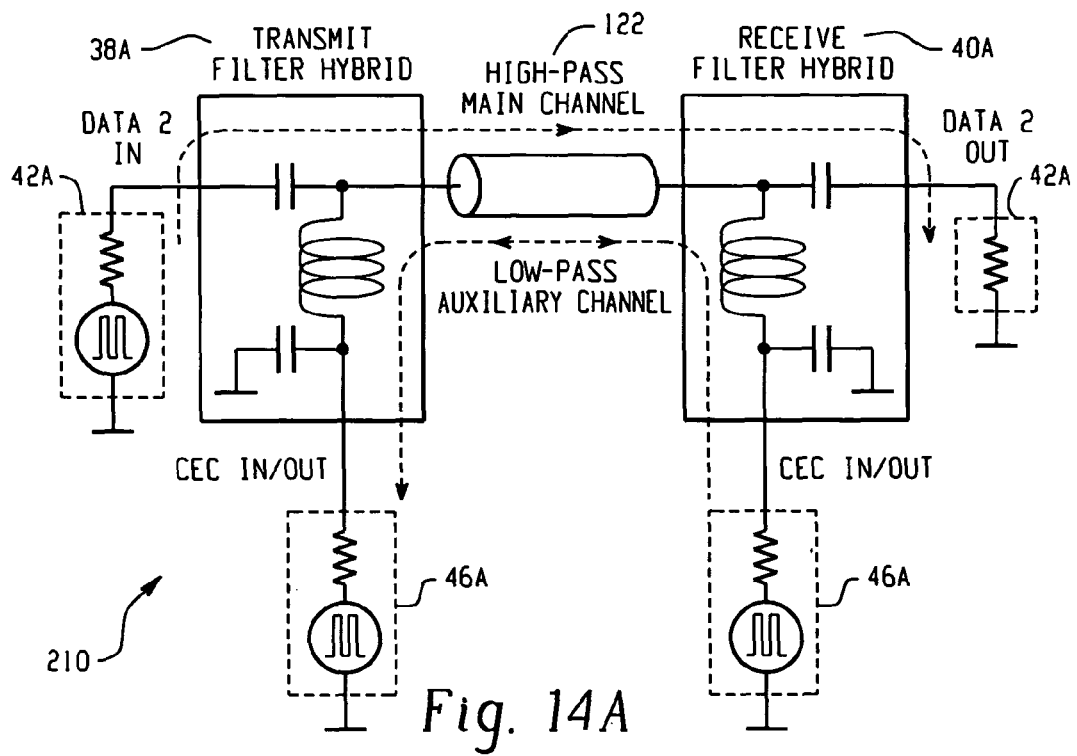
FIGS. 14A through 14E are more detailed circuit schematics of the HDMI interface shown in FIG. 8.

FIGS. 14A through 14E are more detailed circuit schematics of the HDMI interface shown in FIG. 8. FIG. 14A shows the frequency multiplexing and demultiplexing of the HDMI DATA2 content channel 42A with the CEC auxiliary channel 44A via the transmit and receive filter hybrids 38A, 40A. The DATA2 content channel 42A is coupled to the high pass input of the transmit filter hybrid 38A and the bidirectional CEC channel 44A is coupled to the low pass input of the same hybrid 38A. These two signals are frequency multiplexed in the hybrid 38A by operation of the combined high pass and low pass filters therein and output as a combined signal on the coaxial medium 122. At the receive filter hybrid 40A, the combined signal from the coaxial medium 122 is supplied to the high pass and low pass filters of the receive hybrid 40A, which frequency demultiplexes the combined signal into a high pass output (DATA 2) 42A and a low pass output (CEC) 44A.

Figure 14B:
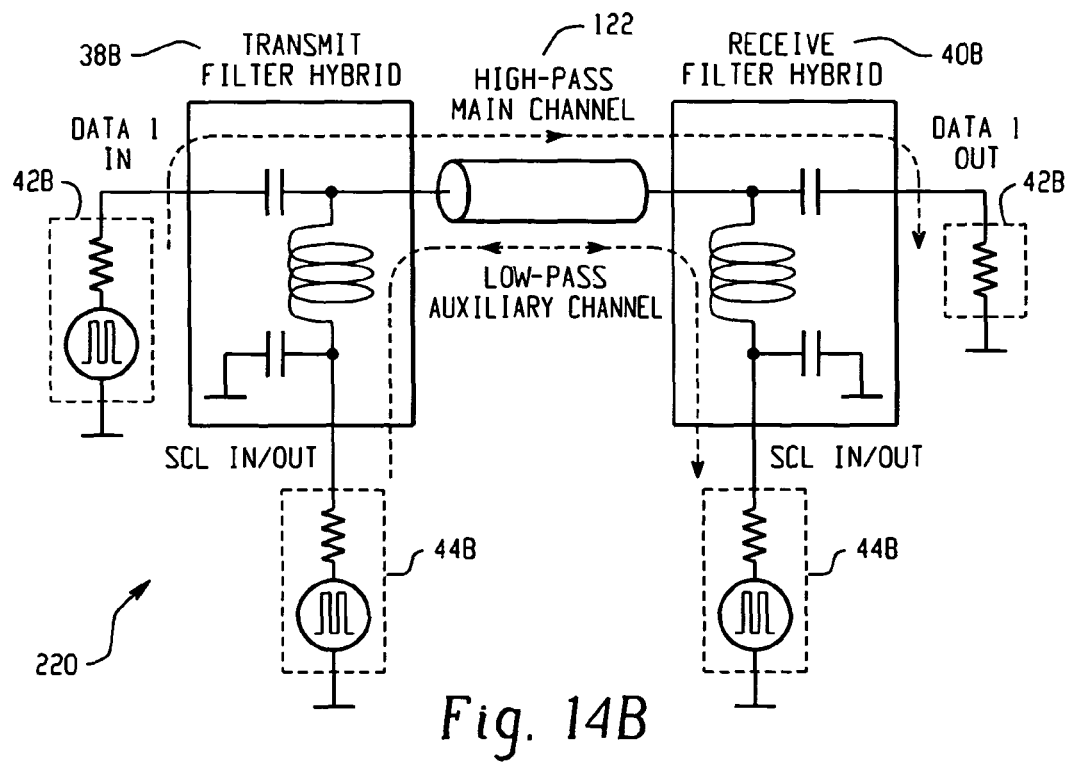
Figure 14C:
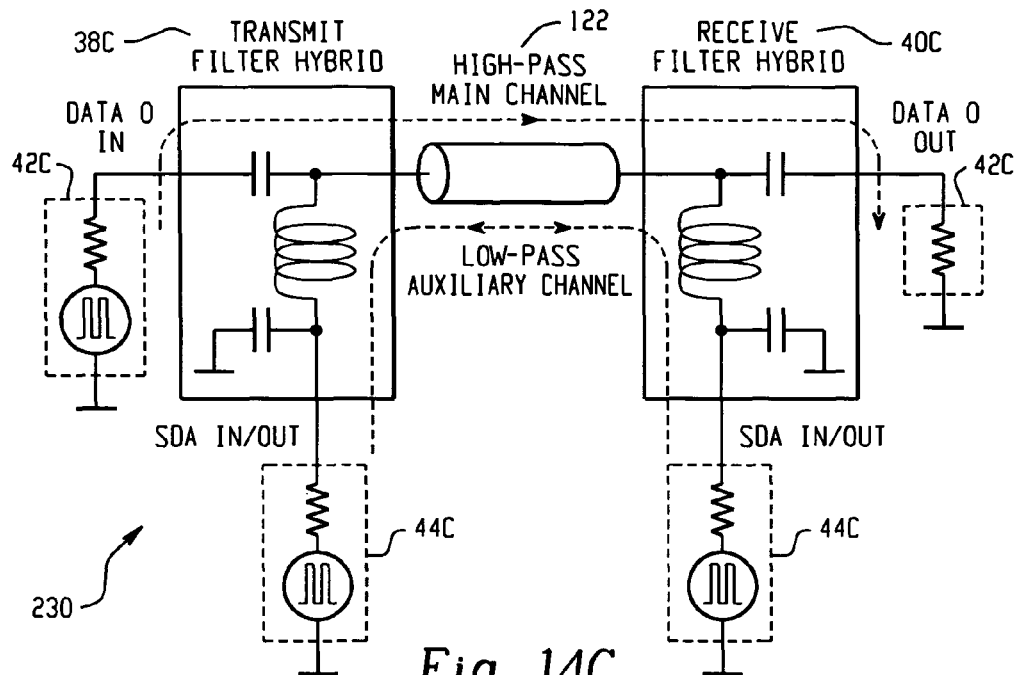
Figure 14D:
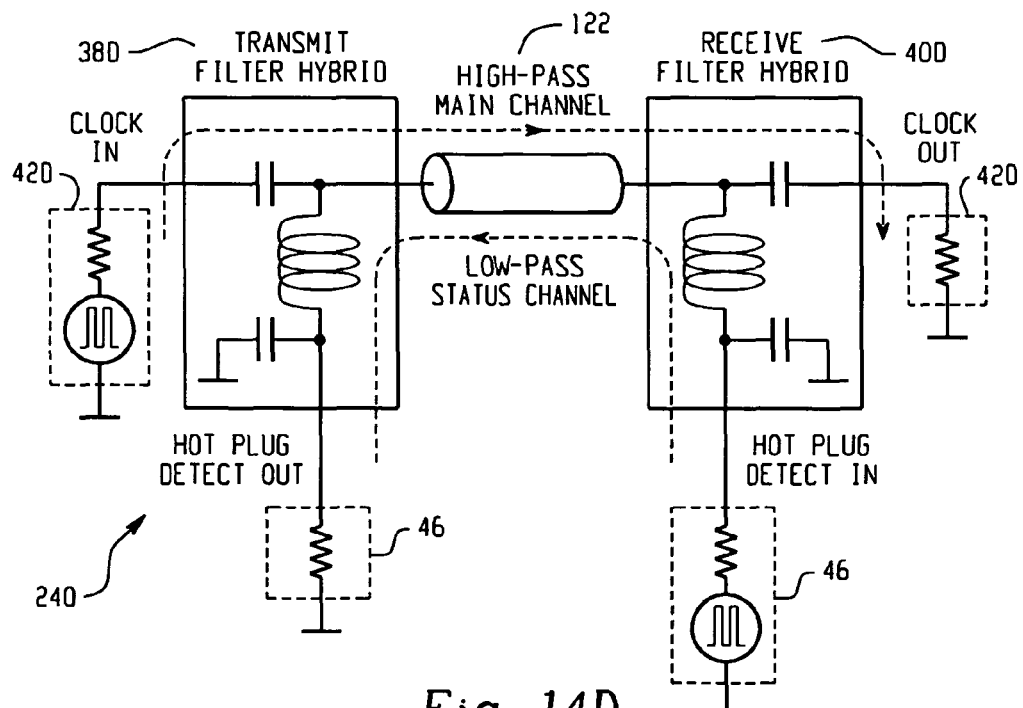
Figure 14E:
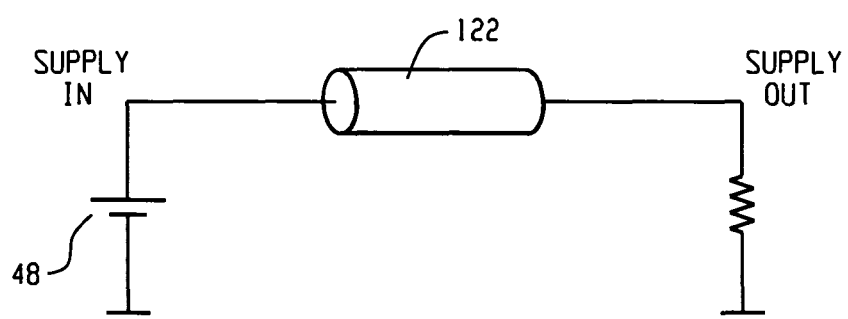

FIG. 14B is similar to FIG. 14A, but demonstrates the multiplexing and demultiplexing of the HDMI DATA1 content signal 42B and the bidirectional SCL auxiliary channel 44B. FIG. 14C demonstrates further the multiplexing and demultiplexing of the HDMI DATA0 content signal 42C and the bidirectional SDA auxiliary channel 44C. FIG. 14D demonstrates further the multiplexing and demultiplexing of the HDMI CLOCK signal 42D and the unidirectional hot-plug detect (HPD) signal 46. And FIG. 14E demonstrates the simple pass-through power channel 48.

In the above examples, the transmit and receive filters 38, 40 are identical in structure although used in opposite directions. This gives the opportunity to send and receive signals in both directions over each link and provides a hybrid of simplex and duplex links as per the requirement of the application. Each filter hybrid provides a high-pass input/output for the main channel and a low pass input/output for either one of the supply, status, or auxiliary channels. One or more band pass input/outputs may also be provided for additional multiplexing. Alternatively to the examples described above, the transmit and receive filters 38, 40 may not be identical, but instead may be specifically tailored for either the transmit or receive end of the multi-media interface, depending upon the desired application.

Figure 15A:
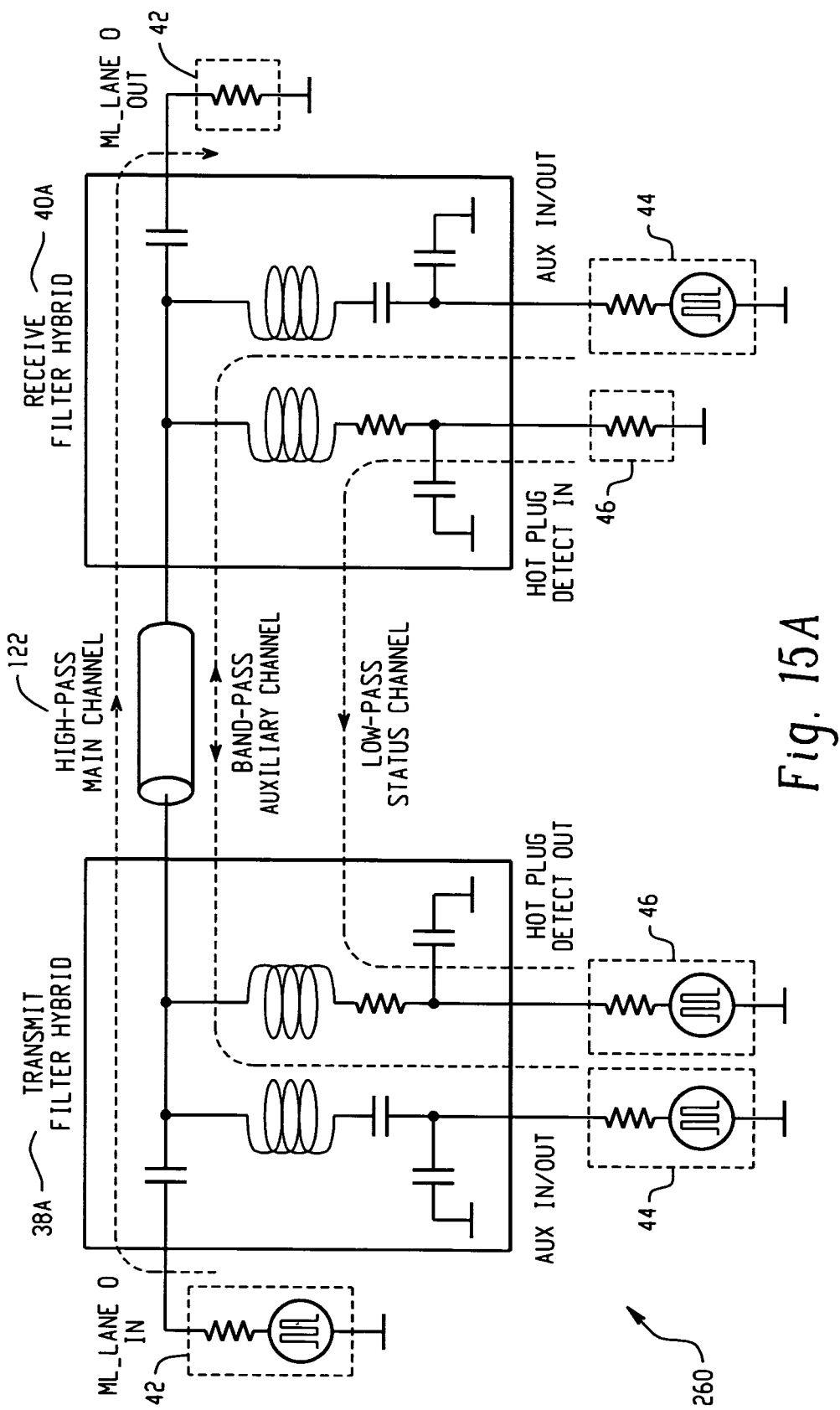
FIG. 15A is a more detailed circuit schematic of a single-channel DisplayPort interface as described with reference to FIG. 10.

FIG. 15A is a more detailed circuit schematic of a single-channel DisplayPort interface as described with reference to FIG. 10. In this interface, the transmit filter hybrid 38A includes a high pass input for receiving the single DisplayPort content channel (ML_LANE0), a band pass input for receiving the bidirectional auxiliary channel 44, and a low pass input for receiving the unidirectional HPD status channel 46. These channels are frequency multiplexed in the filter hybrid 38A into a combined signal and transported over the single medium 122 to the receive filter hybrid 40A. The receive filter hybrid 40A demultiplexes the combined signal from the single medium 122 into a high pass output (ML_LANE0) 42, a band pass output (auxiliary channel) 44, and a low pass output (which in this case is the HPD input signal from the multi-media sink) 46.

Figure 15B:
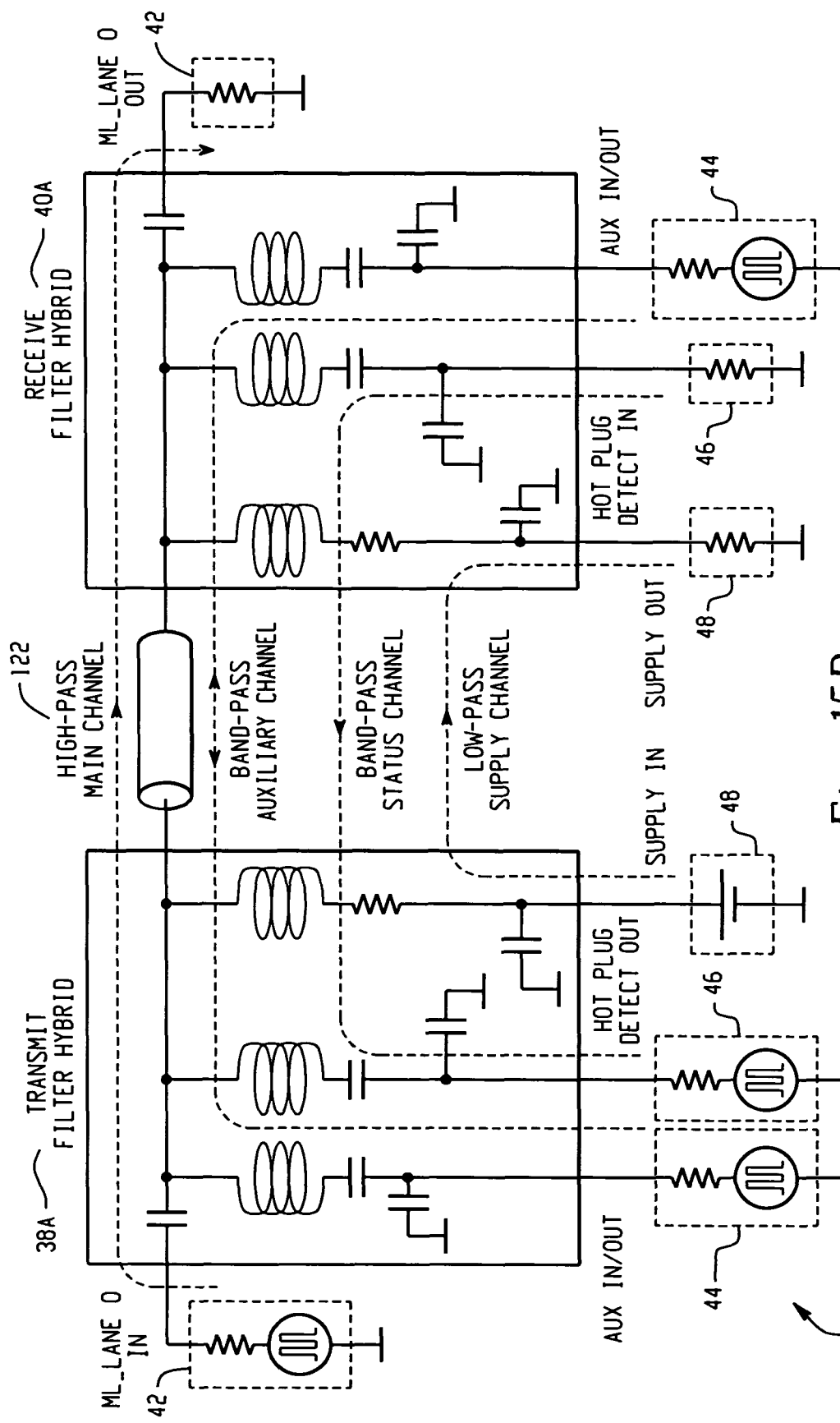
FIG. 15B is also a more detailed circuit schematic of a single-channel DisplayPort interface as described with reference to FIG. 10, but with the additional feature of transmitting power over the frequency multiplexed data channel.

FIG. 15B is also a more detailed circuit schematic of a single-channel DisplayPort interface as described with reference to FIG. 10, but with the additional feature of transmitting power over the frequency multiplexed data channel. In this configuration, the filter hybrids 38A, 40A include a high pass input, two band pass inputs, and a low pass output. The high pass circuitry passes the data channel (ML_LANE0), the first band pass circuit passes the auxiliary channel 44, the second band pass circuit passes the HPD signal 46, and the low pass circuitry passes the power channel 48.

The two above examples demonstrate single link implementations for the DisplayPort interface where only one main channel is enough to support transmission of the content. Where higher resolutions and/or higher color depths mandate inclusion of additional main channels, either further multiplexing between content channels is required or use of additional links similar to the example shown in FIG. 9.

Figure 16:
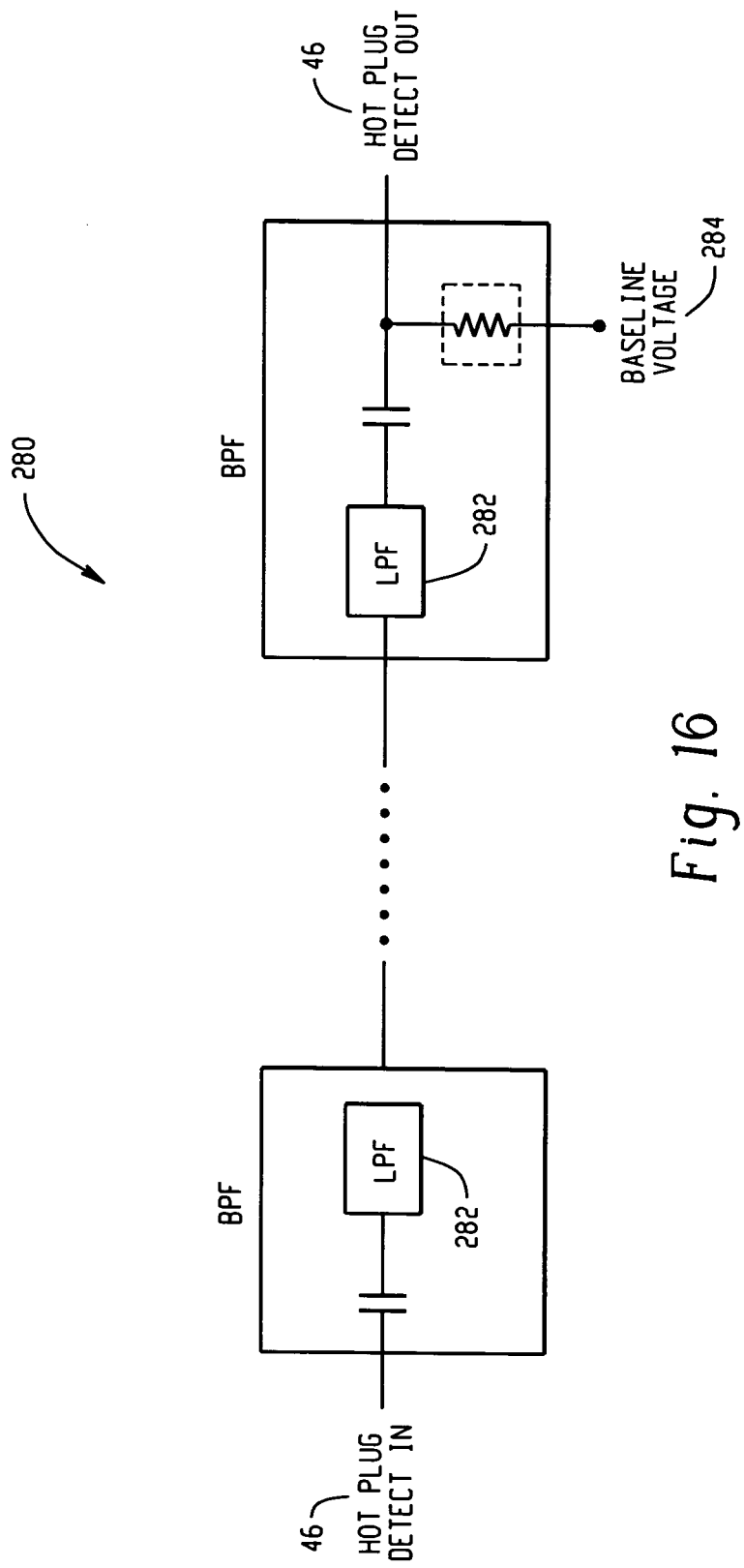
FIG. 16 is a diagram showing the concept of conditioning the hot-plug detect signal for frequency multiplexing in a band-pass status channel.

In some applications it may be necessary or desired to condition some of the signals to fit them within the assigned channel bandwidth. The hot plug detect (HPD) signal in the above "DisplayPort over single cable" case is an example of a signal that may need some manipulation. This manipulation may include some type of modulation (such as frequency modulation or shift keying) or filtering and reconstructing. The hot plug detect signal typically includes very low frequency content that may interfere with the supply channel. In this case, it may be preferable to transmit only the transitions or pulses that usually appear on top of a steady-state baseline value through the band-pass status channel and reconstruct the baseline value locally in the hot plug detect receive side. With this signal conditioning and reconstructing, the need for a low-pass channel that is typically needed to carry the hot plug detect signal is eliminated, leaving the low frequency spectrum for the supply channel. This idea is conceptually illustrated in FIG. 16, where the high-pass property of the band-pass filter, extracted via coupling capacitor, removes the low-frequency content on the transmit side. This is then reconstructed on the receive side using the baseline voltage 284.

This written description uses examples to disclose the invention, including the best mode, and also to enable a person skilled in the art to make and use the invention. The patentable scope of the invention may include other examples that occur to those skilled in the art.

We claim:

1. A method of interfacing a first multi-media digital device with a second multi-media digital device, comprising:
   converting a plurality of differential digital content channels from the first multi-media digital device into a plurality of single-ended digital content channels, including combining, through frequency-multiplexing, one or more auxiliary channels with one or more of the plurality of single-ended digital content channels to form a combined channel;
   transmitting the combined channel from the first multi-media digital device to the second multi-media digital device via one or more coaxial cables; and
   receiving the combined channel from the one or more coaxial cables and converting the combined channel back into a plurality of differential digital content channels that are supplied to the second multi-media digital device.

2. The method of claim 1, further comprising:
   combining a second auxiliary channel with one or more of the plurality of single-ended digital content channels to form a second combined channel.

3. The method of claim 1, further comprising:
   separating the combined channel into the one or more auxiliary channels and the at least one of the plurality of digital content channels at the second multi-media digital device.

4. The method of claim 1, further comprising:
   combining the plurality of single-ended digital content channels into a combined digital content channel; and
   transmitting the combined digital content channel over a single coaxial cable coupling the first multi-media digital device to the second multi-media digital device.

5. The method of claim 1, further comprising:
   combining one or more single-ended digital content channels with one or more second auxiliary channels to form a second combined channel; and
   transmitting the second combined channel over a single coaxial cable coupling the first multi-media digital device to the second multi-media digital device.

6. The method of claim 5, further comprising:
   separating the second combined channel into the one or more single-ended digital content channels and the one or more second auxiliary channels at the second multi-media digital device.

7. The method of claim 5, wherein the one or more second auxiliary channels includes a configuration and control channel, the method further comprising:
   transmitting information on the configuration and control channel from the second multi-media digital device to the first multi-media digital device via the single coaxial cable.

8. The method of claim 7, wherein the configuration and control channel is a bidirectional configuration and control channel, the method further comprising:
   transmitting information on the bidirectional configuration and control channel between the second multi-media digital device and the first multi-media digital device via the single coaxial cable.

9. The method of claim 7, wherein the configuration and control channel carries information regarding the configuration and operation of the second multi-media digital device.

10. The method of claim 1, wherein at least one digital content channel is a clock channel, the method further comprising:
    combining the clock channel with the one or more auxiliary channels to form the combined channel; and transmitting the combined channel over a single coaxial cable coupling the first multi-media digital device to the second multi-media digital device.

11. The method of claim 5, wherein the one or more auxiliary channels includes a status channel, the method further comprising:
transmitting information on the status channel from the second multi-media digital device back to the first multi-media digital device via the single coaxial cable.

12. The method of claim 11, wherein the status channel carries hot-plug detect information associated with the second multi-media digital device.

13. The method of claim 5, wherein the one or more auxiliary channels includes a supply channel for carrying power between the first multi-media digital device and the second multi-media digital device.

14. The method of claim 1, wherein the digital content channels or the one or more auxiliary channels carry encrypted data.

15. The method of claim 1, further comprising:
serializing the combined channel and the plurality of single-ended digital content signals channels except the one or more of the plurality of single-ended digital content channels into a single digital content bit stream;
modulating the digital content bit stream; and
transmitting the digital content bit stream from the first multi-media digital device to the second multi-media digital device via a single coaxial cable.

16. The method of claim 15, further comprising:
conditioning the digital content bit stream prior to transmitting it over the single coaxial cable.

17. The method of claim 16, wherein the conditioning step is based on information regarding the transmission characteristics of the single coaxial cable.

18. The method of claim 15, further comprising:
combining the digital content bit stream with one or more second auxiliary channels into the combined channel; and
transmitting the combined channel over the single coaxial cable.

19. The method of claim 18, further comprising:
separating the combined channel into the digital content bit stream and the one or more second auxiliary channels at the second multi-media digital device.

20. The method of claim 19, further comprising:
demodulating the digital content bit stream; and
deserializing the digital content bit stream to recover the plurality of single-ended digital content channels at the second multi-media digital device.

21. The method of claim 18, wherein the one or more second auxiliary channels includes a configuration and control channel, the method further comprising:
transmitting information on the configuration and control channel from the second multi-media digital device back to the first multi-media digital device via the single coaxial cable.

22. The method of claim 21, wherein the configuration and control channel is a bidirectional configuration and control channel, the method further comprising:
transmitting information on the bidirectional configuration and control channel between the second multi-media digital device and the first multi-media digital device via the single coaxial cable.

23. The method of claim 21, wherein the configuration and control channel carries information regarding the configuration and operation of the second multi-media digital device.

24. The method of claim 18, further comprising:
combining the second combined channel with a clock channel; and
transmitting the second combined channel and the clock channel over a single coaxial cable coupling the first multi-media digital device to the second multi-media digital device.

25. The method of claim 18, wherein the one or more second auxiliary channels includes a status channel, the method further comprising:
transmitting information on the status channel from the second multi-media digital device back to the first multi-media digital device via the single coaxial cable.

26. The method of claim 25, wherein the status channel carries hot-plug detect information associated with the second multi-media digital device.

27. The method of claim 18, wherein the one or more second auxiliary channels includes a supply channel for carrying power between the first multi-media digital device and the second multi-media digital device.

28. The method of claim 1, further comprising:
transmitting the plurality of single-ended digital content channels from the first multi-media digital device to the second multi-media digital device via a plurality of coaxial cables.

29. The method of claim 28, further comprising:
for each of the plurality of single-ended digital content channels, transmitting the single-ended digital content channel from the first multi-media digital device to the second multi-media digital device via a separate coaxial cable.

30. The method of claim 28, further comprising:
transmitting a differential clock signal from the first multi-media digital device to the second multi-media digital device.

31. The method of claim 30, wherein the differential clock signal is transmitted from the first multi-media digital device to the second multi-media digital device via a twisted-pair cable.

32. The method of claim 30, further comprising:
converting the differential clock signal into a single-ended clock signal; and
transmitting the single-ended clock signal from the first multi-media digital device to the second multi-media digital device via one of the one or more coaxial cables.

33. The method of claim 28, further comprising:
transmitting one or more auxiliary channels between the first multi-media digital device and the second multi-media digital device.

34. The method of claim 33, further comprising:
combining the one or more auxiliary channels with at least one of the plurality of digital content channels to form a combined channel and transmitting the combined channel from the first multi-media digital device to the second multi-media digital device.

35. The method of claim 34, further comprising:
separating the combined channel into the one or more auxiliary channels and the at least one of the plurality of digital content channels at the second multi-media digital device.

36. The method of claim 1, further comprising:
frequency multiplexing at least one of the single-ended digital content channels with one or more auxiliary channels to form a combined signal; and
transmitting the combined signal to the second multi-media digital device over at least one of the one or more coaxial cables.

37. The method of claim 36, further comprising:
receiving the combined signal from the coaxial cable; and
demultiplexing the single-ended digital content channel from the auxiliary channel.

38. The method of claim 36, further comprising:
frequency multiplexing at least one of the single-ended digital content channels with a plurality of auxiliary channels to form a combined signal; and
transmitting the combined signal to the second multi-media digital device over at least one of the one or more coaxial cables.

39. The method of claim 36, further comprising:
applying a high-pass filter to at least one single-ended digital content channel to form a high-pass content channel;
applying a low-pass filter to the auxiliary channel to form a low-pass auxiliary channel; and
combining the high-pass content channel with the low-pass auxiliary channel to form the combined signal.

40. The method of claim 38, further comprising:
applying a high-pass filter to the least one single-ended digital content channel to form a high-pass content channel;
applying a low-pass filter to one of the plurality of auxiliary channels to form a low-pass auxiliary channel;
applying a band-pass filter to one of the plurality of auxiliary channels to form a band-pass auxiliary channel; and
combining the high-pass content channel with the low-pass auxiliary channel and the band-pass auxiliary channel to form the combined signal.

41. The method of claim 36, wherein the one or more auxiliary channels includes a configuration and control channel, the method further comprising:
transmitting information on the configuration and control channel from the second multi-media digital device back to the first multi-media digital device via one of the one or more coaxial cables.

42. The method of claim 41, wherein the configuration and control channel is a bidirectional configuration and control channel, the method further comprising:
transmitting information on the bidirectional configuration and control channel between the second multi-media digital device and the first multi-media digital device via one of the one or more coaxial cables.

43. The method of claim 41, wherein the configuration and control channel carries information regarding the configuration and operation of the second multi-media digital device.

44. The method of claim 1, further comprising:
frequency multiplexing at least one of the single-ended digital content channels with a clock channel to form a combined signal; and
transmitting the combined signal to the second multi-media digital device over at least one of the one or more coaxial cables.

45. The method of claim 36, wherein the one or more auxiliary channels includes a status channel, the method further comprising:
transmitting information on the status channel from the second multi-media digital device back to the first multi-media digital device via one of the one or more coaxial cables.

46. The method of claim 45, wherein the status channel carries hot-plug detect information associated with the second multi-media digital device.

47. The method of claim 36, wherein the one or more auxiliary channels includes a supply channel for carrying power between the first multi-media digital device and the second multi-media digital device via one of the one or more coaxial cables.

48. The method of claim 36, further comprising:
providing a first and second filter hybrid for each of the plurality of single-ended digital content channels, the first filter hybrid positioned in proximity to the first multi-media digital device and the second filter hybrid positioned in proximity to the second multi-media digital device;
generating a plurality of combined signals using the first filter hybrids, each of the plurality of combined signals comprising one of the single-ended digital content channels and an auxiliary channel; and
transmitting the plurality of combined signals from the first multi-media digital device to the second multi-media digital device via the one or more coaxial cables.

49. The method of claim 48, further comprising:
extracting the single-ended digital content signals and the auxiliary channels using the second filter hybrids.

50. The method of claim 48, wherein the first filter hybrids comprise a high pass input for receiving the single-ended digital content channel, a low pass input for receiving the auxiliary channel, and a combined frequency-multiplexed output for outputting a combined signal.

51. The method of claim 48, wherein the first filter hybrids comprise a high-pass input for receiving the single-ended digital content channel, a low-pass input for receiving a first auxiliary channel, a band-pass input for receiving a second auxiliary channel, and a combined frequency-multiplexed output for outputting a combined signal.

52. The method of claim 48, wherein the first filter hybrids comprise a high-pass filter coupled between the high pass input and the combined frequency-multiplexed output, and a low-pass filter coupled between the low-pass input and the combined frequency multiplexed output.

53. The method of claim 51, wherein the first filter hybrids comprise a high-pass filter coupled between the high pass input and the combined frequency-multiplexed output, a low-pass filter coupled between the low pass input and the combined frequency multiplexed output, and a band-pass filter coupled between the band-pass input and the combined frequency multiplexed output.

54. The method of claim 1, wherein the plurality of differential digital content channels are HDMI content channels.

55. The method of claim 1, wherein the plurality of differential digital content channels are DisplayPort content channels.

56. The method of claim 7, wherein the configuration and control channel is a Consumer Electronics Control (CEC) channel.

57. The method of claim 7, wherein the configuration and control channel is a Display Data channel.

58. The method of claim 7, wherein the configuration and control channel is an Enhanced Display Data channel.

59. The method of claim 7, wherein the configuration and control channel is an Enhanced Extended Display Identification channel.

60. An interface system for coupling a first multi-media digital device with a second multi-media digital device, comprising:
a plurality of differential to single-ended converters that convert a plurality of differential digital content channels from the first multi-media digital device into a plurality of single-ended digital content channels, including combining, through frequency-multiplexing, one or more auxiliary channels with one or more of the plurality of single-ended digital content channels to form a combined channel;
one or more coaxial cables for transporting the combined channel from the first multi-media digital device to the second multi-media digital device; and
a plurality of single-ended to differential converters that convert the combined channel from the one or more coaxial cables back into a plurality of differential digital content channels that are supplied to the second multi-media digital device.

61. The interface system of claim 60, further comprising:
interface circuitry for combining a second auxiliary channel with one or more of the plurality of single-ended digital content channels to form a second combined channel.

62. The interface system of claim 60, further comprising:
one or more separators for separating the combined channel into the one or more auxiliary channels and the at least one of the plurality of digital content channels at the second multi-media digital device.

63. The interface system of claim 60, further comprising:
circuitry for combining the plurality of single-ended digital content channels into a combined digital content channel; and
means for transmitting the combined digital content channel over a single coaxial cable coupling the first multi-media digital device to the second multi-media digital device.

64. The interface system of claim 60, further comprising:
one or more combiners for combining one or more single-ended digital content channels with one or more second auxiliary channels to form a second combined channel; and
means for transmitting the second combined channel over a single coaxial cable coupling the first multi-media digital device to the second multi-media digital device.

65. The interface system of 64, further comprising:
one or more separators for separating the second combined channel into the one or more single-ended digital content channels and the one or more second auxiliary channels at the second multi-media digital device.

66. The interface system of claim 64, wherein the one or more second auxiliary channels includes a configuration and control channel, the system further comprising:
means for transmitting information on the configuration and control channel from the second multi-media digital device to the first multi-media digital device via the single coaxial cable.

67. The interface system of claim 66, wherein the configuration and control channel is a bidirectional configuration and control channel, the system further comprising:
means for transmitting information on the bidirectional configuration and control channel between the second multi-media digital device and the first multi-media digital device via the single coaxial cable.

68. The interface system of claim 66, wherein the configuration and control channel carries information regarding the configuration and operation of the second multi-media digital device.

69. The interface system of claim 60, wherein at least one of the digital content channels is a clock channel, the method further comprising:
circuitry for combining the combined digital content channel with one or more auxiliary channels to form the combined channel; and
means for transmitting the combined channel over a single coaxial cable coupling the first multi-media digital device to the second multi-media digital device.

70. The interface system of claim 64, wherein the one or more auxiliary channels includes a status channel, the system further comprising:
means for transmitting information on the status channel from the second multi-media digital device back to the first multi-media digital device via the single coaxial cable.

71. The interface system of claim 70, wherein the status channel carries hot-plug detect information associated with the second multi-media digital device.

72. The interface system of claim 64, wherein the one or more auxiliary channels includes a supply channel for carrying power between the first multi-media digital device and the second multi-media digital device.

73. The interface system of claim 60, wherein the digital content channels or the one or more auxiliary channels carry encrypted data.

74. The interface system of claim 60, further comprising:
a serializer coupled to the plurality of single-ended digital content channels for generating a single digital content bit stream; and
a modulator for modulating the digital content bit stream;
wherein the digital content bit stream is transported from the first multi-media digital device to the second multi-media digital device via a single coaxial cable.

75. The interface system of claim 74, further comprising:
circuitry for conditioning the digital content bit stream prior to transporting it over the single coaxial cable.

76. The interface system of claim 75, wherein the conditioning circuitry is coupled to a source of information regarding the transmission characteristics of the single coaxial cable.

77. The interface system of claim 74, further comprising:
at least one combiner for combining the digital content bit stream with one or more second auxiliary channels into the combined channel; and
means for transmitting the combined channel over the single coaxial cable.

78. The interface system of claim 77, further comprising:
at least one separator for separating the combined channel into the digital content bit stream and the one or more second auxiliary channels at the second multi-media digital device.

79. The interface system of claim 78, further comprising:
a demodulator for demodulating the digital content bit stream; and
a deserializer for deserializing the digital content bit stream to recover the plurality of single-ended digital content channels at the second multi-media digital device.

80. The interface system of claim 77, wherein the one or more second auxiliary channels includes a configuration and control channel, the system further comprising:
means for transmitting information on the configuration and control channel from the second multi-media digital device back to the first multi-media digital device via the single coaxial cable.

81. The interface system of claim 80, wherein the configuration and control channel is a bidirectional configuration and control channel, the system further comprising:
means for transmitting information on the bidirectional configuration and control channel between the second multi-media digital device and the first multi-media digital device via the single coaxial cable.

82. The interface system of claim 80, wherein the configuration and control channel carries information regarding the configuration and operation of the second multi-media digital device.

83. The interface system of claim 77, further comprising:
circuitry for combining the second combined channel with a clock channel; and
means for transmitting the second combined channel and the clock channel over a single coaxial cable coupling the first multi-media digital device to the second multi-media digital device.

84. The interface system of claim 77, wherein the one or more second auxiliary channels includes a status channel, the system further comprising:
means for transmitting information on the status channel from the second multi-media digital device back to the first multi-media digital device via the single coaxial cable.

85. The interface system of claim 84, wherein the status channel carries hot-plug detect information associated with the second multi-media digital device.

86. The interface system of claim 77, wherein the one or more second auxiliary channels includes a supply channel for carrying power between the first multi-media digital device and the second multi-media digital device.

87. The interface system of claim 60, further comprising:
a plurality of coaxial cables for transmitting the plurality of single-ended digital content channels from the first multi-media digital device to the second multi-media digital device.

88. The interface system of claim 87, wherein each of the plurality of single-ended digital content channels is coupled to a separate coaxial cable for separately transmitting the single-ended digital content channels from the first multi-media digital device to the second multi-media digital device.

89. The interface system of claim 87, further comprising:
means for transmitting a differential clock signal from the first multi-media digital device to the second multi-media digital device.

90. The interface system of claim 89, further comprising a twisted-pair cable for transmitting the differential clock signal from the first multi-media digital device to the second multi-media digital device.

91. The interface system of claim 89, further comprising:
a differential to single-ended converter for converting the differential clock signal into a single-ended clock signal; and
means for transmitting the single-ended clock signal from the first multi-media digital device to the second multi-media digital device via one of the one or more coaxial cables.

92. The interface system of claim 87, further comprising:
means for transmitting one or more auxiliary channels between the first multi-media digital device and the second multi-media digital device.

93. The interface system of claim 92, further comprising:
a combiner for combining the one or more auxiliary channels with at least one of the plurality of digital content channels to form a combined channel;
wherein the combined channel is transmitted from the first multi-media digital device to the second multi-media digital device.

94. The interface system of claim 93, further comprising:
a separator for separating the combined channel into the one or more auxiliary channels and the at least one of the plurality of digital content channels at the second multi-media digital device.

95. The interface system of claim 60, further comprising:
a frequency multiplexer coupled to at least one of the single-ended digital content channels and one or more auxiliary channels and forming a combined signal; and
means for transmitting the combined signal to the second multi-media digital device over at least one of the one or more coaxial cables.

96. The interface system of claim 95, further comprising:
a demultiplexer at the second multi-media digital device for demultiplexing the single-ended digital content channel from the auxiliary channel.

97. The interface system of claim 95, further comprising:
a frequency multiplexer coupled to at least one of the single-ended digital content channels and a plurality of auxiliary channels and forming a combined signal; and
means for transmitting the combined signal to the second multi-media digital device over at least one of the one or more coaxial cables.

98. The interface system of claim 95, wherein the frequency multiplexer further comprises:
a high-pass filter coupled to the least one single-ended digital content channel to form a high-pass content channel;
a low-pass filter coupled to the auxiliary channel to form a low-pass auxiliary channel; and
combining circuitry for combining the high-pass content channel with the low-pass auxiliary channel to form the combined signal.

99. The interface system of claim 97, wherein the frequency multiplexer further comprises:
a high-pass filter coupled to the least one single-ended digital content channel to form a high-pass content channel;
a low-pass filter coupled to one of the plurality of auxiliary channels to form a low-pass auxiliary channel;
a band-pass filter coupled to one of the plurality of auxiliary channels to form a band-pass auxiliary channel; and
circuitry for combining the high-pass content channel with the low-pass auxiliary channel and the band-pass auxiliary channel to form the combined signal.

100. The interface system of claim 95, wherein the one or more auxiliary channels includes a configuration and control channel, the system further comprising:
means for transmitting information on the configuration and control channel from the second multi-media digital device back to the first multi-media digital device via one of the one or more coaxial cables.

101. The interface system of claim 100, wherein the configuration and control channel is a bidirectional configuration and control channel, the system further comprising:
means for transmitting information on the bidirectional configuration and control channel between the second multi-media digital device and the first multi-media digital device via one of the one or more coaxial cables.

102. The interface system of claim 100, wherein the configuration and control channel carries information regarding the configuration and operation of the second multi-media digital device.

103. The interface system of claim 60, further comprising:
a frequency multiplexer for multiplexing at least one of the single-ended digital content channels with a clock channel to form a combined signal; and
means for transmitting the combined signal to the second multi-media digital device over at least one of the one or more coaxial cables.

104. The interface system of claim 95, wherein the one or more auxiliary channels includes a status channel, the system further comprising:
  means for transmitting information on the status channel from the second multi-media digital device back to the first multi-media digital device via one of the one or more coaxial cables.

105. The interface system of claim 104, wherein the status channel carries hot-plug detect information associated with the second multi-media digital device.

106. The interface system of claim 95, wherein the one or more auxiliary channels includes a supply channel for carrying power between the first multi-media digital device and the second multi-media digital device via one of the one or more coaxial cables.

107. The interface system of claim 95, further comprising:
  a first and second filter hybrid for each of the plurality of single-ended digital content channels, the first filter hybrid positioned in proximity to the first multi-media digital device and the second filter hybrid positioned in proximity to the second multi-media digital device;
  the first filter hybrids generating a plurality of combined signals, each of the plurality of combined signals comprising one of the single-ended digital content channels and an auxiliary channel; and
  means for transmitting the plurality of combined signals from the first multi-media digital device to the second multi-media digital device via the one or more coaxial cables.

108. The interface system of claim 107, further comprising:
  circuitry in the second filter hybrids for extracting the single-ended digital content signals and the auxiliary channels.

109. The interface system of claim 107, wherein the first filter hybrids comprise a high pass input for receiving the single-ended digital content channel, a low pass input for receiving the auxiliary channel, and a combined frequency-multiplexed output for outputting a combined signal.

110. The interface system of claim 107, wherein the first filter hybrids comprise a high-pass input for receiving the single-ended digital content channel, a low-pass input for receiving a first auxiliary channel, a band-pass input for receiving a second auxiliary channel, and a combined frequency-multiplexed output for outputting a combined signal.

111. The interface system of claim 107, wherein the first filter hybrids comprise a high-pass filter coupled between the high pass input and the combined frequency-multiplexed output, and a low-pass filter coupled between the low-pass input and the combined frequency multiplexed output.

112. The interface system of claim 110, wherein the first filter hybrids comprise a high-pass filter coupled between the high pass input and the combined frequency-multiplexed output, a low-pass filter coupled between the low pass input and the combined frequency multiplexed output, and a band-pass filter coupled between the band-pass input and the combined frequency multiplexed output.

113. The interface system of claim 60, wherein the plurality of differential digital content channels are HDMI content channels.

114. The interface system of claim 60, wherein the plurality of differential digital content channels are DisplayPort content channels.

115. The interface system of claim 66, wherein the configuration and control channel is a Consumer Electronics Control (CEC) channel.

116. The interface system of claim 66, wherein the configuration and control channel is a Display Data channel.

117. The interface system of claim 66, wherein the configuration and control channel is an Enhanced Display Data channel.

118. The interface system of claim 66, wherein the configuration and control channel is an Enhanced Extended Display Identification channel.

119. The interface system of claim 60, wherein at least one of the differential digital content channels is a clock channel.

120. The interface system of claim 119, further comprising:
  circuitry for combining the clock channel with at least one auxiliary channel to form a combined channel; and
  means for transmitting the combined channel from the first multi-media digital device to the second multi-media digital device.

121. The interface system of claim 61, further comprising:
  circuitry for conditioning the one or more auxiliary channels prior to being transmitted between the first multi-media digital device and the second multi-media digital device.

122. The method of claim 1, wherein the at least one of the plurality of digital content channels is modulated before being combined with the auxiliary channels.

\* \* \* \* \*